United States Patent
Nitzan et al.

(10) Patent No.: US 11,037,319 B2
(45) Date of Patent: Jun. 15, 2021

(54) CONTAMINANT DETECTION AND BIRD RISK MANAGEMENT AT AIRPORTS

(71) Applicant: X - Sight Systems Ltd., Rosh HaAyin (IL)

(72) Inventors: Alon Nitzan, Rosh HaAyin (IL); Aviv Goner, Kibbutz NaAn (IL); Kfir Gedalyahu, Tel Aviv (IL); Lonia Kanelovitch, Holon (IL); Uri Hadar, Kiryat-Ono (IL); Yaniv Leitner, Modiln (IL); Gaby Bar-Haim, Givatayim (IL); Oded Hanson, Givatayim (IL)

(73) Assignee: X - Sight Systems Ltd., Rosh HaAyin (IL)

( * ) Notice: Subject to any disclaimer, the term of this patent is extended or adjusted under 35 U.S.C. 154(b) by 434 days.

(21) Appl. No.: 16/603,594

(22) PCT Filed: Apr. 10, 2014

(86) PCT No.: PCT/IL2014/050352
§ 371 (c)(1),
(2) Date: Oct. 8, 2019

(87) PCT Pub. No.: WO2014/170895
PCT Pub. Date: Oct. 23, 2014

(65) Prior Publication Data
US 2020/0126248 A1    Apr. 23, 2020

Related U.S. Application Data

(60) Provisional application No. 61/811,854, filed on Apr. 15, 2013, provisional application No. 61/811,868, filed on Apr. 15, 2013.

(51) Int. Cl.
*G06T 7/60* (2017.01)
*G06T 7/586* (2017.01)

(52) U.S. Cl.
CPC .............. *G06T 7/60* (2013.01); *G06T 7/586* (2017.01); *G06T 2207/10028* (2013.01); *G06T 2207/30261* (2013.01)

(58) Field of Classification Search
CPC .. G08G 5/06; G01B 11/02; G06T 2207/30261
See application file for complete search history.

(56) References Cited

U.S. PATENT DOCUMENTS

| 10,495,747 B2 * | 12/2019 | Aoki | G01S 13/885 |
| 2004/0080433 A1 * | 4/2004 | Nitzan | G08G 5/065 340/945 |

(Continued)

FOREIGN PATENT DOCUMENTS

WO    WO 2014/170895    10/2014

OTHER PUBLICATIONS

International Preliminary Report on Patentability dated Oct. 20, 2015 from the International Bureau of WIPO Re. Application No. PCT/IL2014/050352. (6 pages).

(Continued)

*Primary Examiner* — Jayanti K Patel
*Assistant Examiner* — Christopher Kingsbury Glover

(57) ABSTRACT

Systems and methods are described, including a system (100) for automatically ascertaining a height characteristic of a contaminant (104) on a travel surface (102). The system (100) comprises an illumination and imaging device (106). At a first time, when the travel surface (102) is generally free of contaminant, the illumination and imaging device (106) illuminates the travel surface (102) with at least one light beam (119), and images at least one impingement of the at least one light beam (119). At a second time, when the travel surface (102) is covered by a layer of contaminant (104), the illumination and imaging device (106) illuminates the travel surface with a light beam (132), and images an impingement (Continued)

of the light beam on an impingement surface (107). In response to the imaging, a computer (130) calculates the height characteristic of the contaminant. Other embodiments are also described.

9 Claims, 20 Drawing Sheets

(56) References Cited

U.S. PATENT DOCUMENTS

| | | | |
|---|---|---|---|
| 2005/0047864 A1* | 3/2005 | Yamada | G01W 1/14 |
| | | | 404/71 |
| 2005/0172526 A1* | 8/2005 | Taylor | G01B 11/22 |
| | | | 37/466 |
| 2011/0063445 A1* | 3/2011 | Chew | G08G 5/04 |
| | | | 348/159 |
| 2011/0164037 A1 | 7/2011 | Yoshida et al. | |
| 2011/0254725 A1 | 10/2011 | Nitzan et al. | |

OTHER PUBLICATIONS

International Search Report and the Written Opinion dated Sep. 19, 2014 from the International Searching Authority Re. Application No. PCT/IL2014/050352. (9 Pages).

Invitation to Pay Additional Fees dated Jul. 17, 2014 from the International Searching Authority Re. Application No. PCT/IL2014/050352. (2 pages).

\* cited by examiner

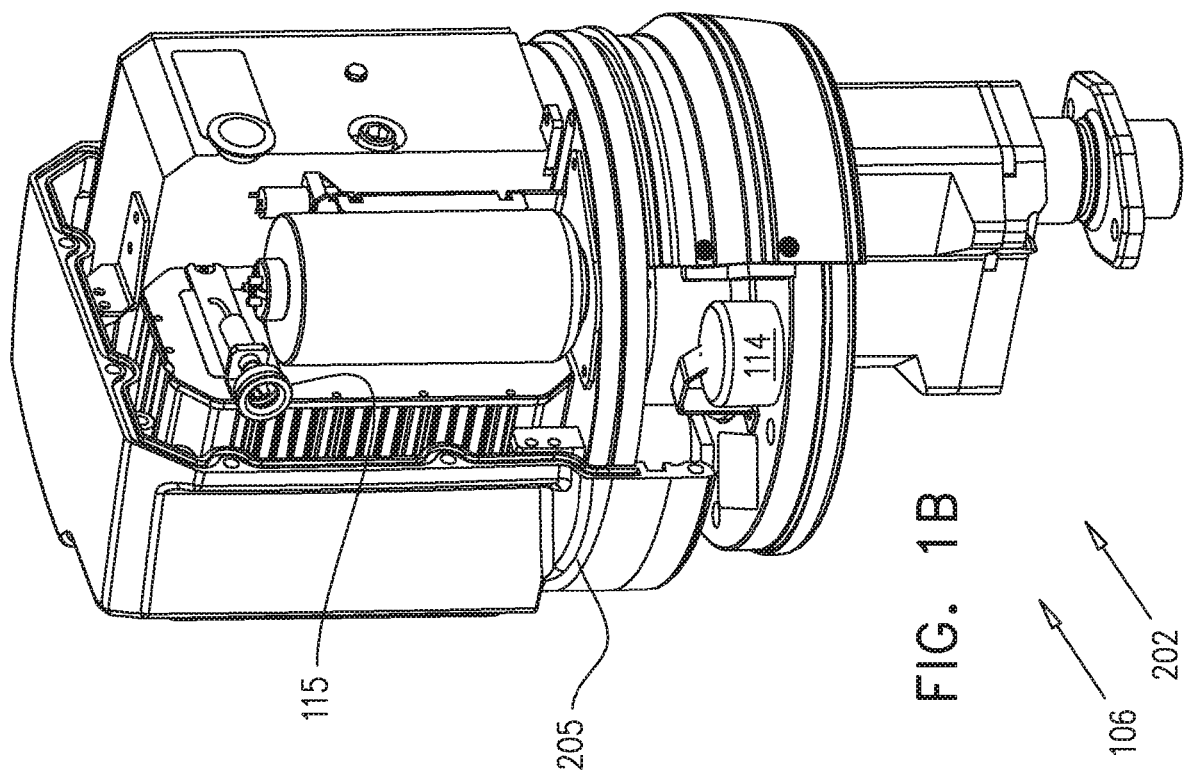
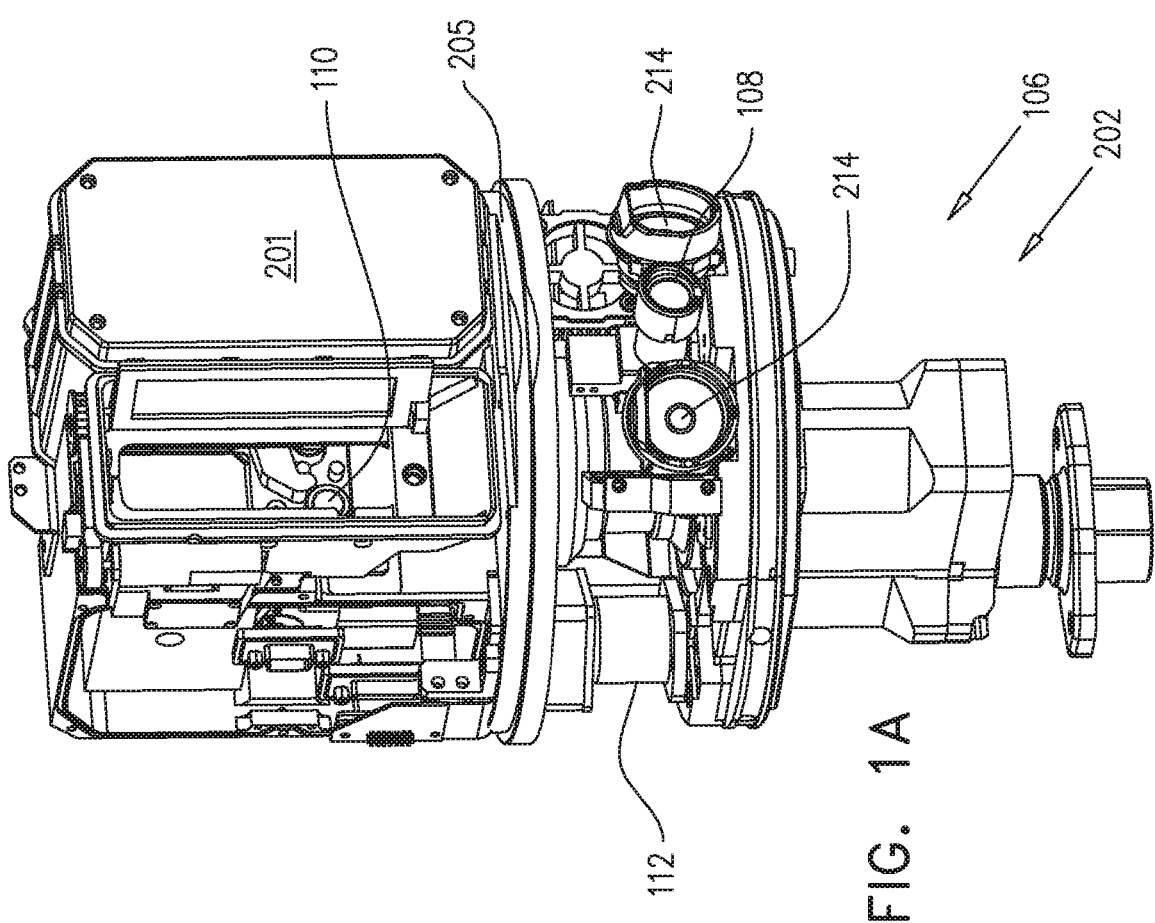

CONTAMINANT DETECTION AND BIRD RISK MANAGEMENT AT AIRPORTS

RELATED APPLICATIONS

This application is a National Phase of PCT Patent Application No. PCT/IL2014/050352 having International filing date of Apr. 10, 2014, which claims the benefit of priority under 35 USC § 119(e) of U.S. Provisional Patent Application Nos. 61/811,854 and 61/811,868, both filed on Apr. 15, 2013. The contents of the above applications are all incorporated by reference as if fully set forth herein in their entirety.

Reference is also made to the following U.S. Patents and Patent Applications which are believed to be related to the subject matter of this patent application and are hereby incorporated by reference in their entirety:

U.S. Pat. Nos. 6,917,309; 7,253,748; 7,663,507; and 8,022,841.

U.S. patent application Ser. No. 12/686,887 (published as US 2010/0109913); Ser. No. 13/029,343 (published as US 2011/0254725); and Ser. No. 13/226,952 (published as US 2012/0194358).

FIELD OF THE INVENTION

The present invention relates to systems and methodologies for automatically detecting and ascertaining characteristics of contaminants on travel surfaces, generally, and for bird risk management at airports, generally.

BACKGROUND

Contaminants, such as snow or water, when contaminating a travel surface, e.g., an airport runway, may pose a serious risk. Additionally, risks posed by birds at airports are well documented, and managing these risks is generally difficult and expensive.

SUMMARY OF THE INVENTION

Embodiments of the present invention provide automated systems and methodologies for ascertaining characteristics of a contaminant, such as snow or water, on a travel surface, such as an aircraft runway. Included in these systems and methodologies is a system for automatically ascertaining the height of the contaminant. The system comprises an illumination and imaging device. At a first time, when the travel surface is generally free of contaminant, the illumination and imaging device illuminates at least a portion of the travel surface with at least one light beam, and images at least one impingement of the light beam on the travel surface. At a second time, when the travel surface is covered by a layer of contaminant, the illumination and imaging device again illuminates the same portion of the travel surface with a light beam. Depending on the nature of the contaminant, the light beam may impinge on the layer of contaminant or on the travel surface. The illumination and imaging device images the impingement, and a computer calculates the height of the contaminant in response to the imaging of the first-time and second-time impingements.

Embodiments of the present invention further provide cost-effective, comprehensive systems and methodologies for bird risk management at airports. Included in these systems and methodologies is a system that comprises at least one detector. The at least one detector detects that a bird may be present. In response to the detecting, at least one computer validates a bird detection, classifies the detected bird as to type of bird, and, in response to the validating and classifying, institutes bird-classification based bird deterrence.

There is therefore provided, in accordance with some embodiments of the present invention, a system for automatically ascertaining at least a height characteristic of a contaminant on a travel surface, the system including an illumination and imaging device configured to, at a first time, illuminate at least a portion of the travel surface with at least one light beam, when the at least a portion of the travel surface is generally free of contaminant, and image at least one first-time impingement of the at least one light beam on the at least a portion of the travel surface, and at a second time that is different from the first time, illuminate the at least a portion of the travel surface with a light beam, when the at least a portion of the travel surface is covered by a layer of the contaminant, and image a second-time impingement of the light beam on a second-time impingement surface, and a computer configured to calculate at least the height characteristic of the contaminant on the travel surface, in response to the imaging of (a) the at least one first-time impingement, and (b) the second-time impingement.

In some embodiments, the second-time impingement surface is a surface of the layer of the contaminant, and the computer is configured to calculate at least the height characteristic of the contaminant on the travel surface, by calculating at least a distance between (a) the second-time impingement, and (b) a point on the travel surface that is closest to the second-time impingement.

In some embodiments, the at least one light beam includes at least two light beams, the illumination and imaging device being configured to image first-time impingements of the at least two light beams at the first time, in response to the imaging at the first time, the computer is configured to ascertain an equation of a plane on which the second-time impingement lies, and the computer is configured to, in response to the equation of the plane, calculate the distance between (a) the second-time impingement, and (b) the point on the travel surface that is closest to the second-time impingement.

In some embodiments, the contaminant includes snow, and the computer is configured to calculate at least the height characteristic of the snow.

In some embodiments, the second-time impingement surface is the at least a portion of the travel surface, the contaminant has a property selected from the group consisting of: transparency, and translucency, and the computer is configured to calculate at least the height characteristic of the contaminant having the selected property.

In some embodiments, the computer is further configured to identify values including an impingement angle of the first-time impingement, an offset second-time impingement point on the travel surface, an angle between (a) a vector joining the illumination and imaging device to the offset second-time impingement point, and (b) a normal to the travel surface at the offset second-time impingement point, an illumination angle of refraction at a surface of the contaminant, and an imaging angle of refraction at the surface of the contaminant, and the computer is configured to calculate at least the height characteristic of the contaminant having the selected property, at least in response to identifying the values.

In some embodiments, the contaminant includes liquid water, and the computer is configured to calculate at least the height characteristic of the liquid water.

In some embodiments, the computer is configured to ascertain, with respect to a coordinate system of the illumination and imaging device, an equation of a plane that is defined by the at least a portion of the travel surface, and the computer is configured to calculate at least the height characteristic of the contaminant at least in response to the equation.

There is further provided, in accordance with some embodiments of the present invention, a system for travel surface contaminant management, the system including at least one detector configured to detect (a) a height of a contaminant on a travel surface, and (b) a temperature of a body selected from the group consisting of: the contaminant, and the travel surface, and a display unit including one or more screens, the display unit being configured to simultaneously display the height and the temperature on a single one of the one or more screens.

In some embodiments, the display unit is configured to simultaneously display the height, the temperature, and an image of the contaminant on the single screen.

In some embodiments, the at least one detector includes an illumination and imaging device configured to, at a first time, illuminate at least a portion of the travel surface with at least one light beam, when the at least a portion of the travel surface is generally free of contaminant, and image at least one first-time impingement of the at least one light beam on the at least a portion of the travel surface, and, at a second time that is different from the first time, illuminate the at least a portion of the travel surface with a light beam, when the at least a portion of the travel surface is covered by a layer of the contaminant, and image a second-time impingement of the light beam on a second-time impingement surface, and a computer configured to calculate the height of the contaminant, in response to the imaging of (a) the at least one first-time impingement, and (b) the second-time impingement.

There is further provided, in accordance with some embodiments of the present invention, a method for automatically ascertaining at least a height characteristic of a contaminant on a travel surface, the method including using an illumination and imaging device to, at a first time, illuminate at least a portion of the travel surface with at least one light beam, when the at least a portion of the travel surface is generally free of contaminant, and image at least one first-time impingement of the at least one light beam on the at least a portion of the travel surface, and at a second time that is different from the first time, illuminate the at least a portion of the travel surface with a light beam, when the at least a portion of the travel surface is covered by a layer of the contaminant, and image a second-time impingement of the light beam on a second-time impingement surface, and, using a computer, calculating at least the height characteristic of the contaminant on the travel surface, in response to the imaging of (a) the at least one first-time impingement, and (b) the second-time impingement.

In some embodiments, the second-time impingement surface is a surface of the layer of the contaminant, and calculating at least the height characteristic of the contaminant on the travel surface includes calculating at least a distance between (a) the second-time impingement, and (b) a point on the travel surface that is closest to the second-time impingement.

In some embodiments, the at least one light beam includes at least two light beams, the illumination and imaging device being configured to image first-time impingements of the at least two light beams at the first time, and calculating at least the height characteristic of the contaminant on the travel surface includes, in response to the imaging at the first time, ascertaining an equation of a plane on which the second-time impingement lies, and in response to the equation of the plane, calculating the distance between (a) the second-time impingement, and (b) the point on the travel surface that is closest to the second-time impingement.

In some embodiments, the contaminant includes snow, and calculating at least the height characteristic of the contaminant includes calculating at least a height characteristic of the snow.

In some embodiments, the second-time impingement surface is the at least a portion of the travel surface, the contaminant has a property selected from the group consisting of: transparency, and translucency, and calculating at least the height characteristic of the contaminant includes calculating at least a height characteristic of the contaminant having the selected property.

In some embodiments, the method further includes identifying values including an impingement angle of the first-time impingement, an offset second-time impingement point on the travel surface, an angle between (a) a vector joining the illumination and imaging device to the offset second-time impingement point, and (b) a normal to the travel surface at the offset second-time impingement point, an illumination angle of refraction at a surface of the contaminant, and an imaging angle of refraction at the surface of the contaminant, and calculating at least the height characteristic of the contaminant having the selected property includes calculating the height characteristic of the contaminant having the selected property at least in response to identifying the values.

In some embodiments, the contaminant includes liquid water, and calculating at least the height characteristic of the contaminant includes calculating at least the height characteristic of the liquid water.

In some embodiments, the method further includes using the computer to ascertain, with respect to a coordinate system of the illumination and imaging device, an equation of a plane that is defined by the at least a portion of the travel surface, and calculating at least the height characteristic of the contaminant on the travel surface includes calculating at least the height characteristic in response to the equation.

There is further provided, in accordance with some embodiments of the present invention, a method for travel surface contaminant management, the method including, using at least one detector, detecting (a) a height of a contaminant on a travel surface, and (b) a temperature of a body selected from the group consisting of: the contaminant, and the travel surface, and displaying simultaneously, on a single screen, the height and the temperature.

In some embodiments, the method further includes displaying simultaneously with the height and the temperature, on the single screen, an image of the contaminant.

In some embodiments, detecting the height of the contaminant includes using an illumination and imaging device to, at a first time, illuminate at least a portion of the travel surface with at least one light beam, when the at least a portion of the travel surface is generally free of contaminant, and image at least one first-time impingement of the at least one light beam on the at least a portion of the travel surface, and, at a second time that is different from the first time, illuminate the at least a portion of the travel surface with a light beam, when the at least a portion of the travel surface is covered by a layer of the contaminant, and image a second-time impingement of the light beam on a second-time impingement surface, and, using a computer, calculating the height of the contaminant, in response to the imaging of (a) the at least one first-time impingement, and (b) the second-time impingement.

There is further provided, in accordance with some embodiments of the present invention, a method for airport bird management, the method including, using at least one detector, detecting a presence of a candidate bird, using a computer, validating a detection of a bird by ascertaining that the candidate bird is a detected bird, using a computer, classifying the detected bird as to type of bird, and, responsive to the validating and the classifying, instituting bird-classification-based bird deterrence.

In some embodiments, the detecting includes optically imaging at least one image of the candidate bird, the validating a detection of a bird includes processing, using a computer, the at least one image, and validating the detection in response thereto, and the classifying includes processing, using a computer, the at least one image, and classifying the detected bird as to type of bird in response thereto.

In some embodiments, the processing includes performing at least one process selected from the group consisting of: shadow removal, image flipping, and image scaling.

In some embodiments, the processing includes creating a binary image of the candidate bird, summing rows of the binary image to create a row-sum function, calculating a derivative of the row-sum function, finding a location of a maximum and a location of a minimum of the derivative, and removing a shadow in response to the location of the maximum and the location of the minimum.

In some embodiments, the detecting includes detecting using a plurality of airport-travel-surface-foreign-object detectors.

In some embodiments, the validating a detection of a bird includes validating in response to outputs of a plurality of detectors.

In some embodiments, the validating a detection of a bird includes performing cascade filtering.

In some embodiments, the instituting bird-classification-based bird deterrence includes employing airport-travel-surface-foreign-object detectors equipped with deterrence functionality.

In some embodiments, the validating a detection of a bird includes validating using a multi-bird-class classifier, and the classifying includes classifying using the multi-bird-class classifier.

In some embodiments, the validating a detection of a bird includes validating using a binary classifier, and the classifying includes classifying using a multi-bird-class classifier.

In some embodiments, the validating a detection of a bird includes validating using a computerized bird feature database.

In some embodiments, the classifying includes classifying using a computerized bird feature database.

There is further provided, in accordance with some embodiments of the present invention, a system for airport bird management, the system including at least one detector configured to detect a presence of a candidate bird, and at least one computer configured to validate a detection of a bird by ascertaining that the candidate bird is a detected bird, classify the detected bird as to type of bird, and, in response to the validating and the classifying, institute bird-classification-based bird deterrence.

In some embodiments, the at least one detector includes at least one imaging device configured to optically image the candidate bird, and the at least one computer is configured to process at least one image of the candidate bird, validate a detection of a bird, in response to the processing, and classify the detected bird as to type of bird, in response to the processing.

In some embodiments, the at least one computer is configured to process the at least one image by performing at least one process selected from the group consisting of: shadow removal, image flipping, and image scaling.

In some embodiments, the at least one computer is configured to process the at least one image by creating a binary image of the candidate bird, creating a row-sum function by summing rows of the binary image, calculating a derivative of the row-sum function, finding a location of a maximum and a location of a minimum of the derivative, and removing a shadow in response to the location of the maximum and the location of the minimum.

In some embodiments, the at least one detector includes a plurality of airport-travel-surface-foreign-object detectors.

In some embodiments, the at least one computer is configured to validate the detection of a bird in response to outputs of a plurality of detectors.

In some embodiments, the at least one computer is configured to validate the detection of a bird by performing cascade filtering.

In some embodiments, the at least one computer is configured to institute bird-classification-based bird deterrence by employing airport-travel-surface-foreign-object detectors equipped with deterrence functionality.

In some embodiments, the at least one computer is configured to validate a detection of a bird using a multi-bird-class classifier, and classify the bird detected as to type of bird using the multi-bird-class classifier.

In some embodiments, the at least one computer is configured to validate a detection of a bird using a binary classifier, and classify the bird detected as to type of bird using a multi-bird-class classifier.

In some embodiments, the at least one computer is configured to validate a detection of a bird using a computerized bird feature database.

In some embodiments, the at least one computer is configured to classify the detected bird as to type of bird using a computerized bird feature database.

There is further provided, in accordance with some embodiments of the present invention, a method of deterring an animal from remaining on a travel surface, the method including, using a first deterrence device disposed at a first distance from the animal, simulating a deterring entity by emitting a first deterrence sound of the deterring entity, and, following the emitting of the first deterrence sound, using a second deterrence device disposed at a second distance from the animal that is less than the first distance, simulating an approach toward the animal of the deterring entity by emitting a second deterrence sound of the deterring entity.

There is further provided, in accordance with some embodiments of the present invention, a method of deterring an animal from remaining on a travel surface having a plurality of sides, the method including, using a computer on which is stored a set of rules, identifying, based on the set of rules, one of the plurality of sides of the travel surface, using the computer, in response to the identifying, selecting a subset of a plurality of deterrence devices, and communicating deterrence instructions to the selected subset of the plurality of deterrence devices, and, using the selected subset, in response to the deterrence instructions, deterring the animal from remaining on the travel surface.

In some embodiments, identifying the one of the plurality of sides based on the set of rules includes identifying a side of the travel surface at which a lair of the animal is located.

In some embodiments, identifying the one of the plurality of sides based on the set of rules includes identifying a side of the travel surface that is not adjacent to another travel surface.

There is further provided, in accordance with some embodiments of the present invention, a system for deterring an animal from remaining on a travel surface, the system including at least one detector configured to detect the animal, and a computer configured to, in response to the detector detecting the animal, drive a first deterrence device disposed at a first distance from the animal to simulate a deterring entity by emitting a first deterrence sound of the deterring entity, and, following the emitting of the first deterrence sound, drive a second deterrence device disposed at a second distance from the animal that is less than the first distance to simulate an approach toward the animal of the deterring entity by emitting a second deterrence sound of the deterring entity.

There is further provided, in accordance with some embodiments of the present invention, a system for deterring an animal from remaining on a travel surface having a plurality of sides, the system including at least one detector configured to detect the animal, and a computer on which is stored a set of rules, the computer being configured to, in response to the detector detecting the animal, identify, based on the set of rules, one of the plurality of sides of the travel surface, in response to the identifying, select a subset of a plurality of deterrence devices, and drive the selected subset to deter the animal from remaining on the travel surface.

In some embodiments, the computer is configured to identify the one of the plurality of sides by identifying a side of the travel surface at which a lair of the animal is located.

In some embodiments, the computer is configured to identify the one of the plurality of sides by identifying a side of the travel surface that is not adjacent to another travel surface.

The present invention will be more fully understood from the following detailed description of embodiments thereof, taken together with the drawings, in which:

BRIEF DESCRIPTION OF THE DRAWINGS

FIGS. 1A-B are schematic illustrations of a foreign object detector, in accordance with some embodiments of the present invention;

DETAILED DESCRIPTION OF EMBODIMENTS

Figure 2:
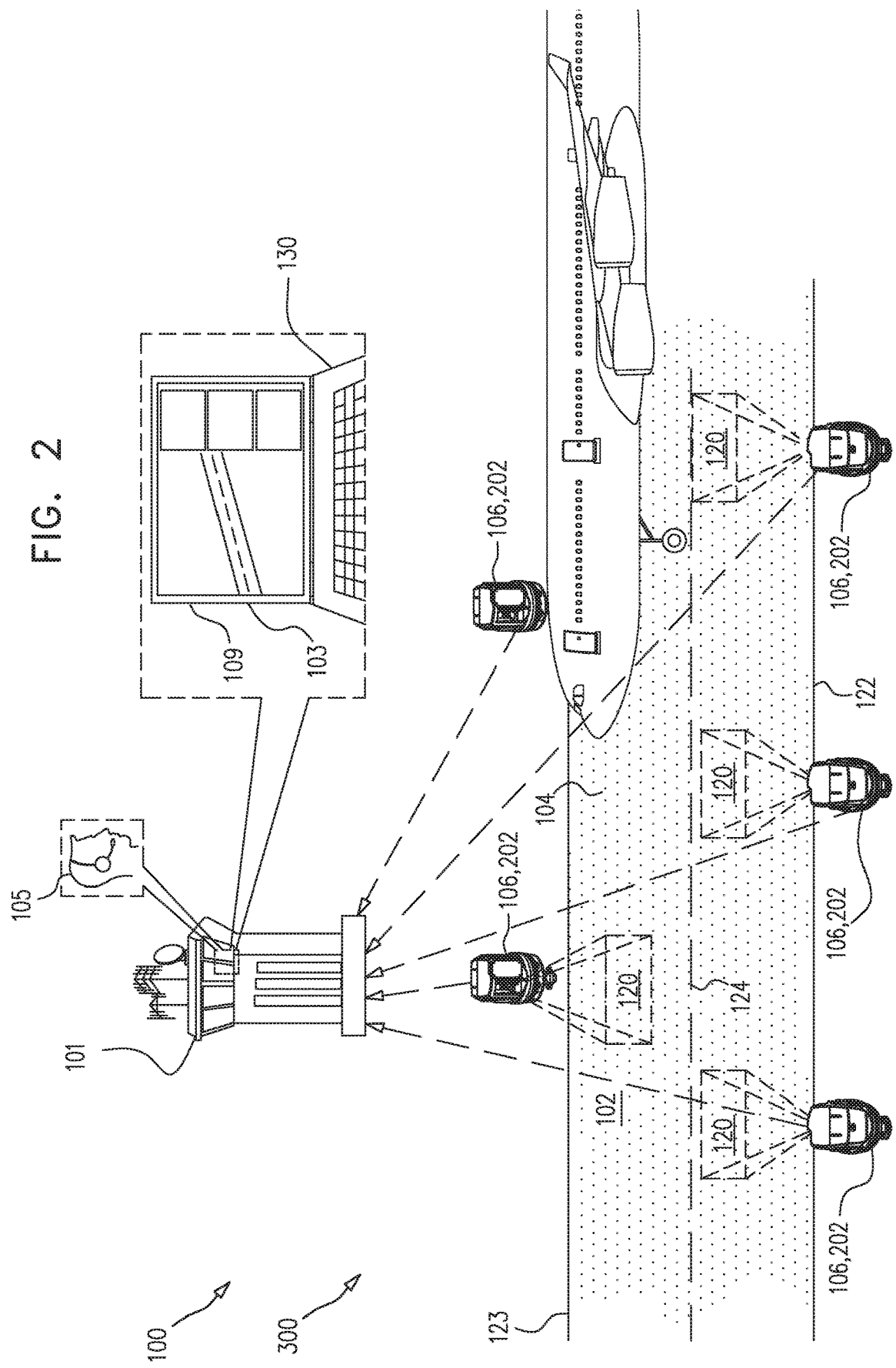
FIG. 2 is a schematic illustration of a system for automatically ascertaining at least a height characteristic of a contaminant on a travel surface, in accordance with some embodiments of the present invention.

Reference is made to FIGS. 1A-B, which are schematic illustrations of a foreign object detector 202, in accordance with some embodiments of the present invention. Foreign object detector 202 comprises an illumination and imaging device 106, which comprises an illumination device 108, comprising, for example, a laser. Illumination and imaging device 106 further comprises an imaging device 110, comprising, for example, a CCD camera. The location and orientation of imaging device 110 are adjusted by means of one or more motors, such as azimuth motor 112 shown in FIG. 1A. One or more motor encoders, such as azimuth encoder 114 shown in FIG. 1B, measure the azimuth, elevation, and location of imaging device 110. Typically, detector 202 further comprises a remote temperature sensor such as an infrared-based temperature sensor 115. In some embodiments, as further described hereinbelow, detector 202 is used for contaminant detection and/or for bird risk management.

Reference is now made to FIG. 2, which is a schematic illustration of a system 100 for automatically ascertaining at least a height characteristic of a contaminant 104 (e.g., water or snow) on a travel surface 102 (e.g., an airport runway), in accordance with some embodiments of the present invention. System 100 comprises one or more foreign object detectors 202, each of which comprises an illumination and imaging device 106, described hereinabove with reference to FIGS. 1A-B. System 100 further comprises a computer 130. Using techniques described hereinbelow, each illumination and imaging device 106 typically illuminates and images a portion 120 of travel surface 102 in its vicinity, and computer 130 calculates at least a height characteristic of contaminant 104 in response to the imaging. (Thus, for typical embodiments in which system 100 comprises a plurality of foreign object detectors 202, system 100 typically ascertains the height of contaminant 104 at a plurality of locations along travel surface 102.)

Figure 3:
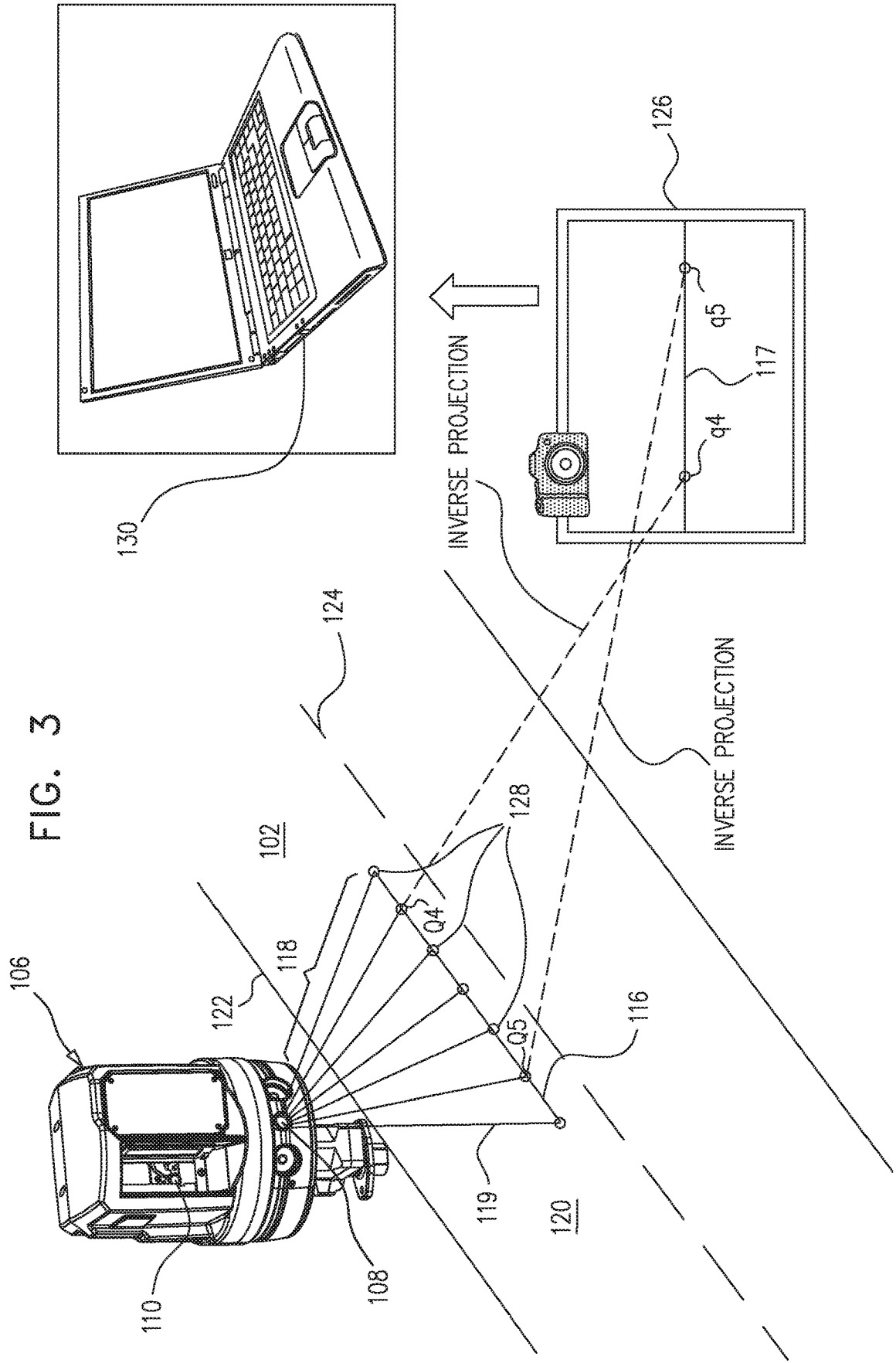
FIG. 3 is a schematic illustration of an imaging of an impingement of at least one light beam on a portion of a travel surface at a first time, in accordance with some embodiments of the present invention.

Reference is now made to FIG. 3, which is a schematic illustration of an imaging of an impingement of at least one light beam 119 on a portion 120 of travel surface 102 at a first time, in accordance with some embodiments of the present invention. The "first time" is a time at which portion 120 is generally free of contaminant (i.e., generally free of any contaminant). Illumination and imaging device 106 is configured to, at the first time, illuminate portion 120 with at least one light beam 119, and to image at least one first-time impingement of light beam(s) 119 on portion 120.

Typically, the at least one light beam includes a plurality 118 of light beams 119, i.e., at least two light beams 119. The at least two light beams 119 are emitted by illumination device 108, and the impingement of light beams 119 forms a line 116 of impingement points 128. Line 116 is imaged by imaging device 110, and the resulting image 126 is processed in order to identify the image line 117 of line 116. (In the context of the present description, the term "image line" is used to denote the image of a real-world line, such that the image line "corresponds to" the real-world line. The term "image point" will be used in an analogous fashion.) in some embodiments, computer 130 automatically detects image line 117 by techniques known in the art. For example, computer 130 may subtract a background image from image 126, identify the pixels of maximum intensity in the image of the difference, and fit a line equation to the identified pixels. Alternatively or additionally, computer 130 may use a robust algorithm such as the Hough Transform Lines Detector algorithm (U.S. Pat. No. 3,069,654). Line 116 may lie at any angle relative to the near edge 122 of travel surface 102, though for ease of calculation, line 116 is typically made to lie parallel to near edge 122.

The next portion of the present description generally describes the steps that are performed for ascertaining the height a contaminant such as snow that is not transparent or translucent. Beginning with the reference to FIG. 5B, the description will relate to other contaminants, e.g., liquid water.

Following the detection of image line 117, two image points q4 and q5 that lie on image line 117 are selected. Image points q4 and q5 may lie anywhere along line image 117, and need not correspond to any of impingement points 128, example, image points q4 and q5 may be selected via interpolation of image line 117. Points Q4 and Q5 on travel surface 102, which correspond respectively to image points q4 and q5, are ascertained via computing the inverse projection of image points q4 and q5. Generally, the inverse projection of an image point q may be computed by application of the inverse projection formula, described hereinbelow. For purposes of the description below, the superscript T indicates the transpose of a vector. (To facilitate readability of the equations below, a column vector is generally denoted by the transpose of a row vector.) It is noted that all coordinates in the formula below are assumed to be expressed as column vectors in homogenous form; for example, an image point (x, y) in an image is denoted by the vector $q=(x\ y\ 1)^T$, and a real-world point (x, y, z) is denoted by the vector $Q=(x\ y\ z\ 1)^T$. It is further noted that a plane with equation $Ax+By+Cz+D=0$ is denoted by the vector $\pi=(A\ B\ C\ D)^T$. (In the present specification, the symbol $\pi$ will sometimes denote the equation of a plane, while other times will denote the plane itself.)

The inverse projection formula is as follows:

$$Q = \left(I - \frac{T_{CAMERA} \times \pi^T}{T_{CAMERA}^T \times \pi}\right)P^+ q$$

where:
(i) q is the coordinates of the image point;
(ii) Q is the coordinates, in the real-world coordinate system, of the point corresponding to q;
(iii) $P^+$ is the (4×3) pseudo-inverse of the (3×4) camera projection matrix P;
(iv) I is the (4×4) identity matrix;
(v) $T_{CAMERA}$ is the coordinates of the imaging device in the real-world coordinate system; and
(vi) $\pi$ is a plane upon which the point Q lies.

Before applying the inverse projection formula to ascertain Q4 and Q5, computer 130 typically first ascertains the values for several of the arguments in the inverse projection formula, as follows:
(i) $T_{CAMERA}$, the coordinates of imaging device 110 in the real-world coordinate system, is obtained from motor encoder 114.
(ii) P, the projection matrix of imaging device 110, is computed via the formula $P=K[R-RT_{CAMERA}]$,
where:
 (a) $T_{CAMERA}$ is as described above;
 (b) R is the orientation matrix of imaging device 110, obtained from motor encoder 114 and given by the formula $R=R_x(AZ)R_z(EL)$, where $R_x(AZ)$ describes a rotation of AZ degrees around the x axis (azimuth), and $R_z(EL)$ describes a rotation of EL degrees around the z axis (elevation); and (c) K is the calibration matrix of imaging device 110.
(iii) $\pi$ (which, for purposes of ascertaining Q4 and Q5, is $\pi_{RW}$, the plane defined by portion 120 of travel surface 102), may be ascertained, for example, using techniques described hereinbelow with reference to FIG. 7.

Figure 4:
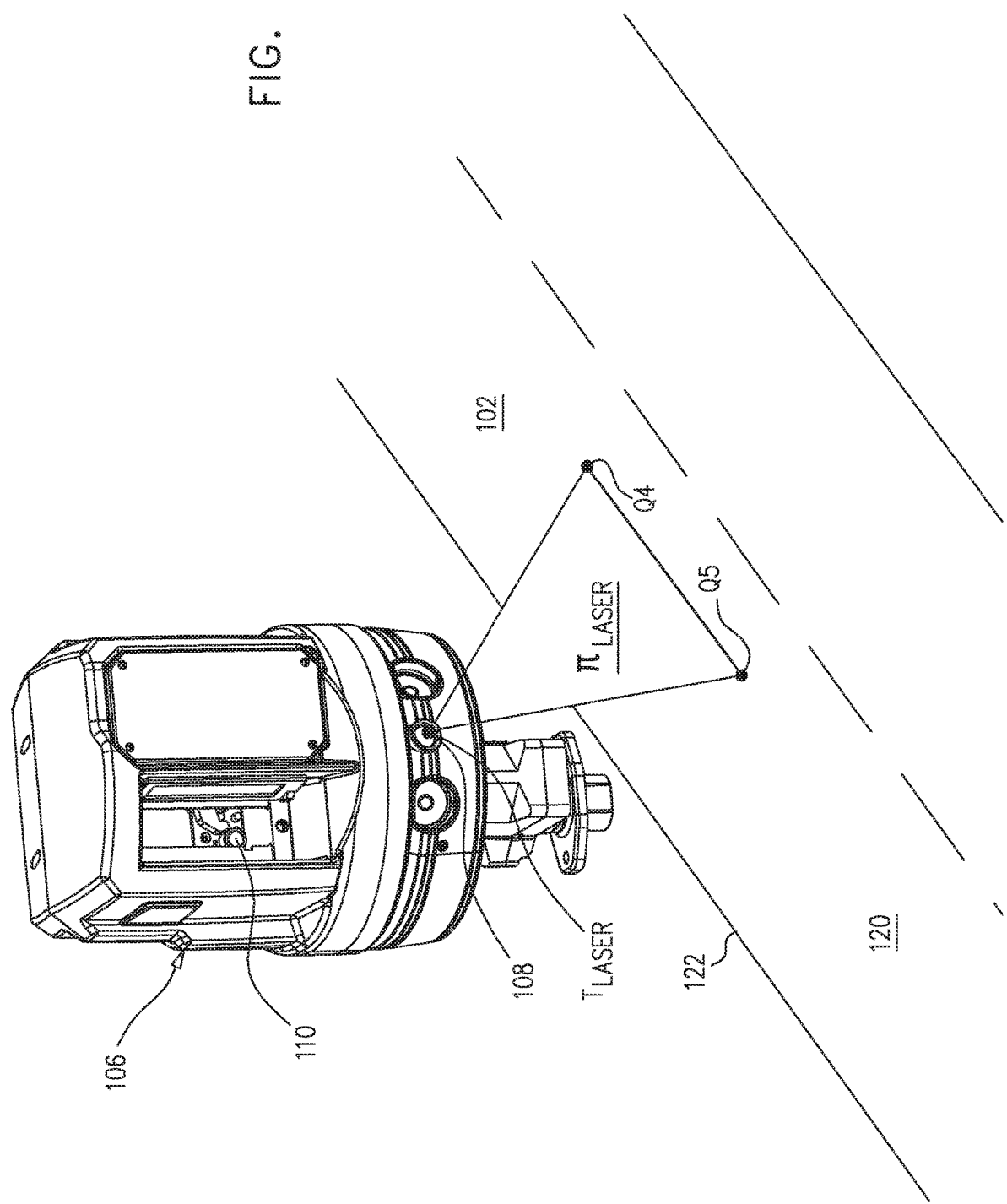
FIG. 4 is a schematic illustration of three points being used to ascertain the equation of a plane, in accordance with some embodiments of the present invention.

Reference is now made to FIG. 4, which is a schematic illustration of three points Q4, Q5, and $T_{LASER}$ being used to ascertain the equation of a plane $\pi_{LASER}$, in accordance with some embodiments of the present invention. As described above with reference to FIG. 3, computer 130 ascertains Q4 and Q5 in response to imaging at least two light beams 119 at the first time. FIG. 4 shows computer further ascertaining $\pi_{LASER}$, in response to the first-time imaging alight beams 119. $\pi_{LASER}$ is the plane on which any impingement of a light beam from illumination device 108 will lie, if illumination device 108 is directed toward line 116 as shown in FIG. 3, or toward an extension of line 116. (Thus, as described hereinbelow with reference to FIG. 5A, $\pi_{LASER}$ is the plane on which the second-time impingement point Q6 lies.) $T_{LASER}$ is the location of the emitting end of illumination device 108, which is typically known a priori, by design. (For sake of simplicity, the present description and notation assumes that illumination device 108 comprises a laser, although in general, the scope of the present invention allows for other types of illumination.)

Generally, the equation of a plane, denoted by the vector $\pi=(A\ B\ C\ D)^T$, may be ascertained from three non-co-linear points $Q_D$, $Q_E$, and $Q_F$ that lie on the plane. (In the description below, points are not represented in their homogenous form, i.e., a point (x, y, z) is denoted by the vector $Q=(x\ y\ z)^T$.) The equation of the plane is ascertained as follows:

(i) The normal to the plane, $n = (A\ B\ C)^T$, is calculated by taking the cross-product of the two vectors $(Q_E - Q_D)$ and $(Q_F - Q_D)$.

(ii) Substituting one of $Q_D$, $Q_E$, or $Q_F$ for Q, the equation $n^T \cdot Q + D = 0$ is solved for D, where the dot indicates the dot product operation.

(iii) The equation of the plane is $Ax + By + Cz + D = 0$. As described hereinabove, this equation may be denoted by the vector $\pi = (A\ B\ C\ D)^T$ Applying the steps above, $T_{LASER}$ is ascertained from Q4, Q5, and $T_{LASER}$.

Figure 5A:
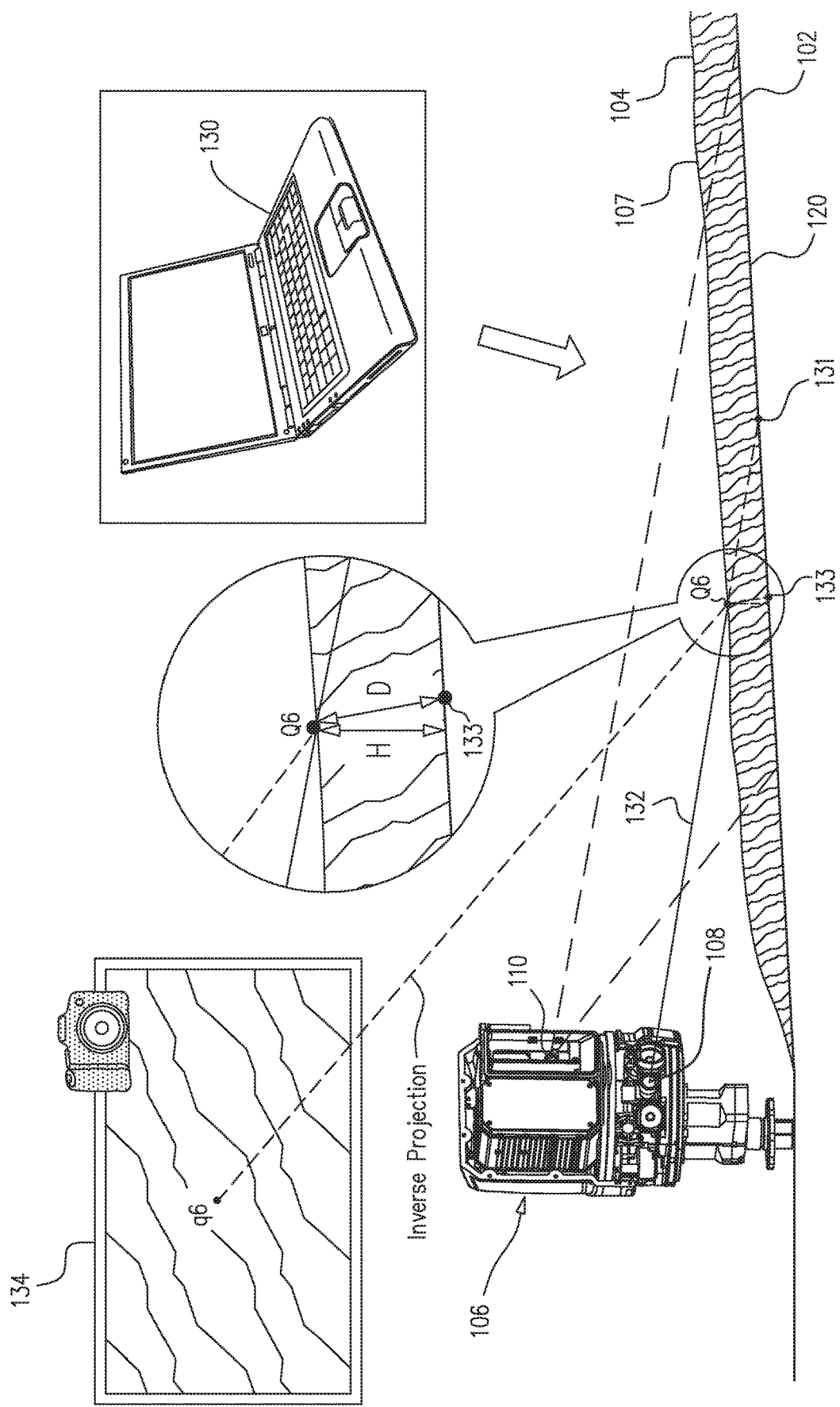
FIGS. 5A-B are schematic illustrations of a second-time impingement of a light beam on a second-time impingement surface, in accordance with some embodiments of the present invention.

Reference is now made to FIG. 5A, which is a schematic illustration of a second-time impingement of a light beam 132 on a second-time impingement surface 107, in accordance with some embodiments of the present invention. The "second time", which is different from the "first time" described hereinabove, is a time at which portion 120 of travel surface 102 is covered by a layer of contaminant 104. As noted above, the present portion of the description relates to a contaminant 104 that is not transparent or translucent, such as snow. Thus, second-time impingement surface 107 is a surface of the layer of contaminant, and, as shown in FIG. 5A, light beam 132 impinges on the layer of contaminant.

As shown in FIG. 5A, illumination and imaging device 106 is configured to, at the second time, illuminate the same portion 120 of travel surface 102 with a light beam 132, and image a second-time impingement of light beam 132 on impingement surface 107, which, in the context of FIG. 5A, is a layer of contaminant 104. Light beam 132 impinges contaminant 104 at second-time impingement point Q6, the image of which appears as image point q6 in image 134. Also shown in FIG. 5A is a theoretical impingement point 131, this being the point at which light beam 132 would have impinged portion 120 of runway 102 if portion 120 had been generally free of contaminant. Illumination device 108 is directed such that theoretical impingement point 131 lies on line 116 as shown in FIG. 3, or on an extension of line 116 thus, point Q6 lies on $\pi_{LASER}$ (FIG. 4). Q6 can therefore be ascertained by calculating the inverse projection of q6, using $\pi_{LASER}$ for $\pi$ in the inverse projection formula.

Typically, to facilitate the identification of q6 in image 134, light beam 132 includes a plurality of light beams, such that a line of second-time impingement points is imaged, all of the second-time impingement points lying on $\pi_{LASER}$. Point q6 on the image line is then selected, e.g., by interpolating the image line.

Computer 130 is configured to calculate at least a height characteristic of contaminant 104 on travel surface 102, in response to the imaging of the at least one first-time impingement and the second-time impingement. In the context of the present portion of the description (i.e., for contaminants that are not transparent or translucent, e.g., snow), computer 130 typically calculates at least a distance D between (a) second-time impingement point Q6, and (b) a point 133 on travel surface 102 that is closest to Q6. Distance D may be considered a height characteristic of contaminant 104. Alternatively or additionally, a vertical height H may be considered a height characteristic of contaminant 104; H may be derived from D by means of geometric analytical techniques known in the art. In practice, when system 100 is applied to airport runways, D and H will be generally similar, in that the slope of an airport runway is typically small, e.g., less than one degree. Typically, distance D and/or height H are calculated for several impingement points Q6, and statistical parameters thereof such as average, standard deviation, minimum, maximum, etc. are calculated and displayed by a display unit 109, as described hereinbelow with respect to FIG. 2.

Computer 130 typically calculates D by applying the formula $D = Q6^T \cdot \pi_{RW}{}^n$, the dot operator and superscript T operating as described hereinabove, where $\pi_{RW}{}^n$ is the normalized vector representation of $\pi_{RW}$. (In general, a plane vector $\pi = (A\ B\ C\ D)^T$ is normalized by dividing the vector by $\sqrt{A^2 + B^2 + C^2}$.) For an airport runway, distance D and/or height H are typically ascertained at a distance from near edge 122 at which the wheels of an airplane are expected to pass, e.g., close to the center line 124 of the runway.

The calculation of D and/or H is in response to the imaging of the at least one first-time impingement (i.e., the at least two first-time impingements 128) shown in FIG. 3, at least in that computer 130 ascertains $\pi_{LASER}$ in response to the imaging. (As described hereinabove, Q6 is then ascertained in response to $\pi_{LASER}$, such that D and/or H may be calculated.) The calculation of D and/or H is further in response to the imaging of the second-time impingement, at least in that Q6 is identified in response to the imaging of the second-time impingement, as described hereinabove.

Figure 5B:
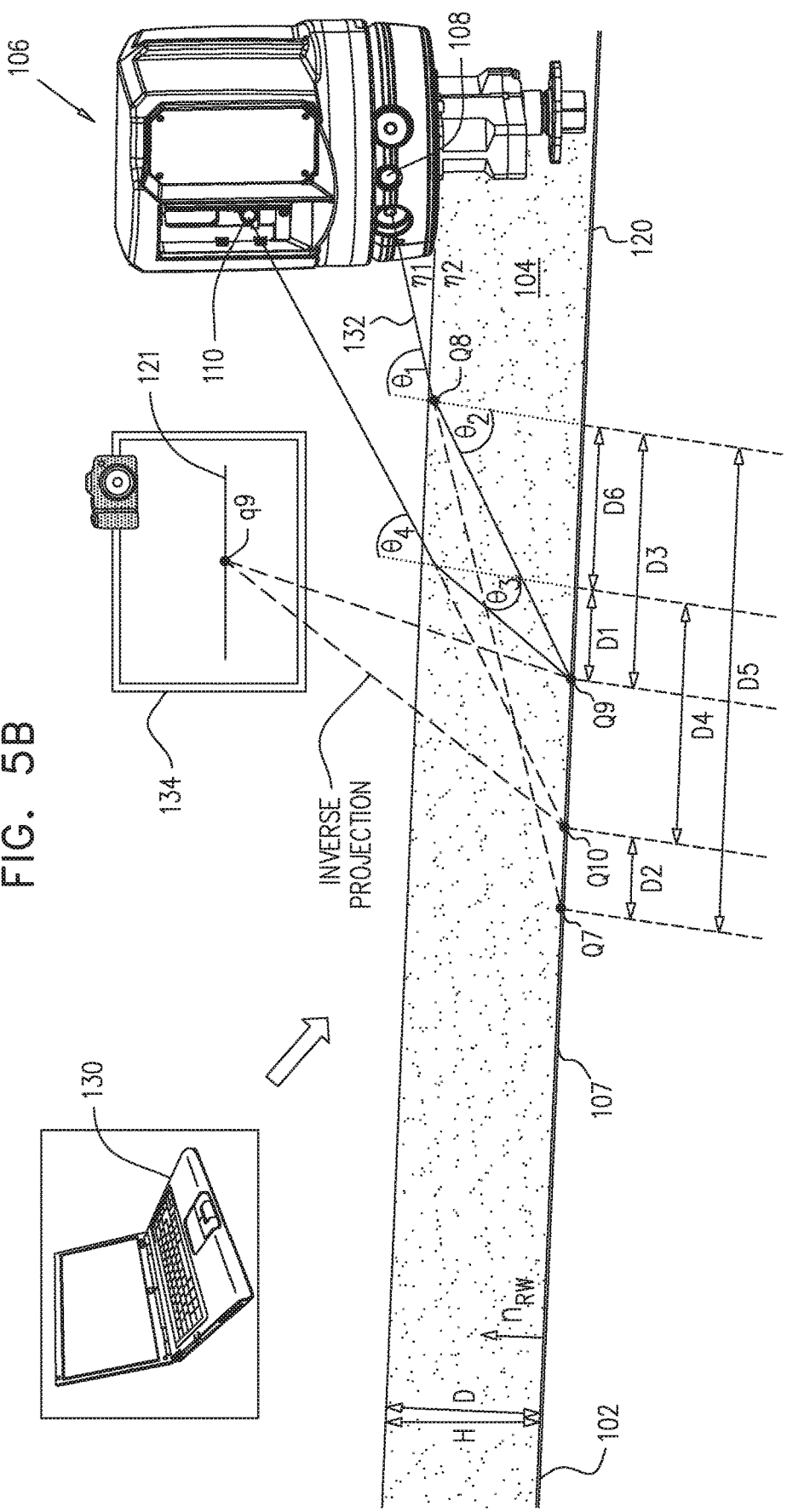

Reference is now made to FIG. 5B, which is a schematic illustration of a second-time impingement of a light beam 132 on a second-time impingement surface 107, in accordance with some embodiments of the present invention. FIG. 5B generally relates to a contaminant that is transparent or translucent, e.g., a contaminant that includes liquid water. For such contaminants, second-time impingement surface 107 is portion 120, such that, as further explained hereinbelow, the second-time impingement is on portion 120. In this respect, the embodiment illustrated in FIG. 5B differs from the embodiment illustrated in FIG. 5A, in which second-time impingement surface 107 is a surface of the layer of contaminant.

Typically, the method illustrated in FIG. 5B generally includes the illumination and imaging techniques described hereinabove with reference to FIG. 3. In other words, typically a plurality 118 of light beams 119 impinges portion 120 of travel surface 102 at the first time, when portion 120 is generally free of contaminant. Line 116 of impingement points is imaged, image line 117 is detected, and line 116 is identified by taking the inverse projection of image line 117. Then, at the second time, when portion 120 is covered by a layer of contaminant 104, portion 120 is illuminated by a light beam 132, light beam 132 being directed toward a point Q7 on line 116, (In this context, light beam 132 being directed toward a particular point means that were contaminant 104 not present, light beam 132 would impinge travel surface 102 at the particular point.) Alternatively, in some embodiments, only one light beam 119 (FIG. 3) impinges portion 120 at the first time, and Q7 is the impingement point of this light beam. (In this case, Q7 is identified by taking the inverse projection of the single image point appearing in image 126 of FIG. 3.)

As shown in FIG. 5B, contaminant 104 causes refraction of light beam 132 at point Q8, at the surface of contaminant 104, the illumination angle of refraction $\Theta_2$ being determined by the respective refraction indices $\eta_2$ and $\eta_1$ of contaminant 104 and the air above contaminant 104. As a result of this refraction, light beam 132 impinges travel surface 102 at point Q9, rather than at point Q7. The second-time impingement of light beam 132 is imaged, such that image point q9, which is the image of impingement point Q9, appears in image 134. However, since the light reaching imaging device 110 is refracted at an imaging angle of refraction $\Theta_3$, per the respective refraction indices of the contaminant and the air above the contaminant, the inverse projection of image point q9 is an offset second-time impingement point Q10, rather than Q9. (In other words, the refraction causes image 134 to appear as if the second-time impingement point were Q10, rather than Q9.)

In response to the imaging of the first-time and second-time impingements, computer 130 calculates at least a height characteristic of contaminant 104. Typically, the calculation of the height is in response to identifying (e.g., calculating) the following two values, in addition to the values $\Theta_2$, $\Theta_3$, and Q10, the identification of which was described above:

(i) $\cos(\Theta_1)=((T_{LASER}-Q7)\cdot n_{RW})/\|T_{LASER}-Q7\|$, $\Theta_1$ being an impingement angle of the first-time impingement, i.e., an angle between (a) a vector that joins illumination device 108 to point Q7, and (b) the normal $n_{RW}$ to travel surface 102 at point Q7 and in the vicinity thereof (e.g., at point Q8, Q10, etc.); and (ii) $\cos(\Theta_4)=((T_{CAMERA}-Q10)\cdot n_{RW})/\|T_{CAMERA}-Q10\|$, $\Theta_4$ being an angle between (a) a vector that joins illumination and imaging device 106 (e.g., imaging device 110) to Q10, and (b) the normal $n_{RW}$ to travel surface 102 at point Q10.

(In (i) and (ii) above, $T_{LASER}$ and $T_{CAMERA}$ are the coordinates of illumination device 108 and imaging device 110, respectively.)

Applying a trigonometric identity, $\sin(\Theta_1)$ and $\sin(\Theta_4)$ are determined from, respectively, $\cos(\Theta_1)$ and $\cos(\Theta_4)$. Then, applying Snell's law of refraction, $\sin(\Theta_2)$ and $\sin(\Theta_3)$ are determined as follows:

$$\sin(\Theta_2)=(\eta_1/\eta_2)\sin(\Theta_1); \text{ and}$$

$$\sin(\Theta_3)=(\eta_1/\eta_2)\sin(\Theta_4).$$

Next, the following pair of equations is solved for the unknown variable D:

$$D6=D5-D4-D2=D\times(\tan(\Theta_1)-\tan(\Theta_4))-D2 \quad (i)$$

$$D6=D3-D1=D\times(\tan(\Theta_2)-\tan(\Theta_3)), \text{ where:} \quad (ii)$$

D2 is the (known) distance between points Q7 and Q10, and

D is the distance between travel surface 120 and the surface of the layer of contaminant 104.

Solving (i) and (ii) for D:

$$D=D2/(\tan(\Theta_1)-\tan(\Theta_4)-\tan(\Theta_2)+\tan(\Theta_3)).$$

As described above with respect to FIG. 5A, distance D may be considered a height characteristic of contaminant 104. Alternatively or additionally, a vertical height H may be considered a height characteristic of contaminant 104. As noted above, H may be derived from D by means of geometric analytical techniques known in the art. The calculation of D and/or H is in response to the imaging of the at least one first-time impingement (FIG. 3), at least in that the imaging of the at least one first-time impingement facilitates the identification of point Q7. The calculation of D and/or H is further in response to the imaging of the second-time impingement (FIG. 5B), at least in that point Q10 is identified via imaging of the second-time impingement.

Typically, travel surface 102 is impinged by a plurality of light beams 132 at the second time, such that an image line 121 appears in image 134. (The impingement line corresponding to image line 121 runs along the x-axis shown in FIG. 7, which, in FIG. 5B, runs into the page.) q9 is then any point on image line 121, and Q7 is the inverse projection of the image point on line 117 (FIG. 3) having the same horizontal position in image 126 as image point q9.

Figure 6:
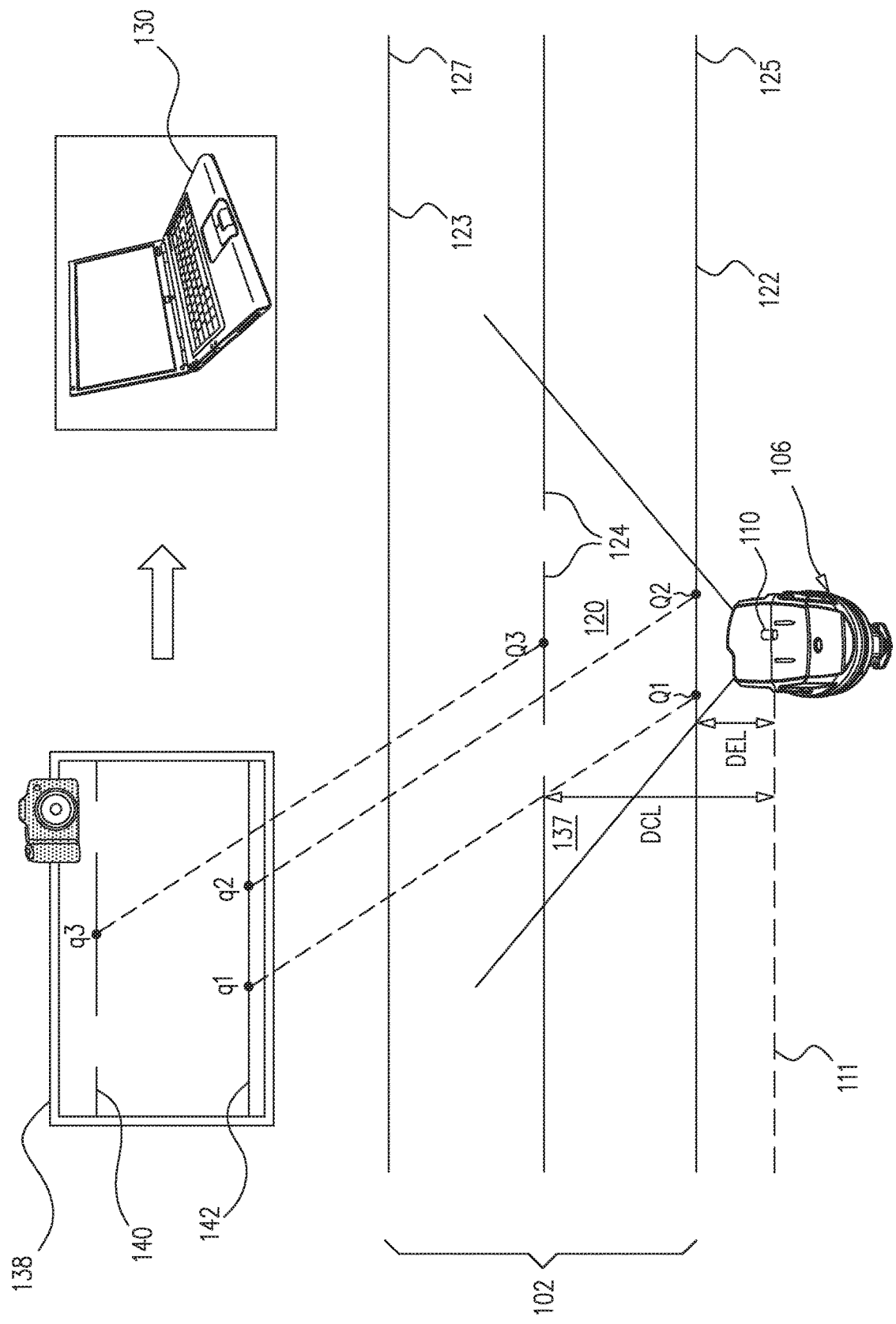
FIG. 6 is a schematic illustration of a system for ascertaining the equation of the plane that is defined by a portion of a travel surface, in accordance with some embodiments of the present invention.
Figure 7:
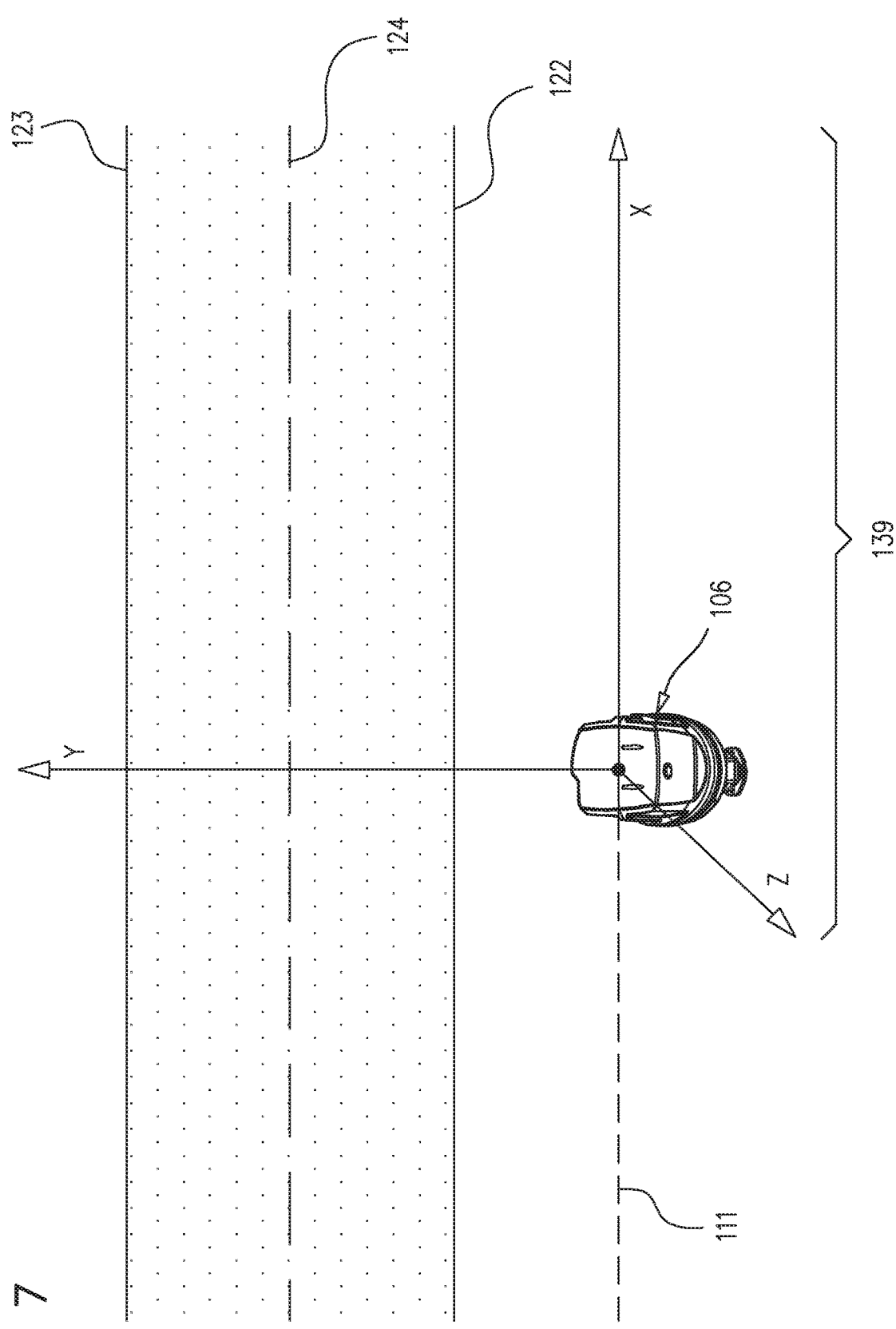
FIG. 7 is a schematic illustration of a coordinate system of an illumination and imaging device, in accordance with some embodiments of the present invention.

Reference is now made to FIG. 6, which is a schematic illustration of a system for ascertaining the equation of the plane that is defined by portion 120 of travel surface 102, in accordance with some embodiments of the present invention. (As described hereinabove, the equation of the plane is denoted by the vector $\pi_{RW}$.) Reference is also made to FIG. 7, which is a schematic illustration of a coordinate system 139 of illumination and imaging device 106, in accordance with some embodiments of the present invention. In some embodiments, computer 130 is configured to ascertain $\pi_{RW}$ with respect to coordinate system 139. Computer 130 is further configured to calculate height characteristic D and/or H responsively to $\pi_{RW}$, as described hereinabove with reference to FIGS. 3, 5A, and 5B. (For example, as described hereinabove with reference to FIG. 5A, computer 130 typically calculates D by means of the formula $D=Q6^T\cdot\pi_{RW}''$.) The ascertaining of $\pi_{RW}$ will now be described.

As shown in FIGS. 6-7, a hypothetical device position line 111, which is parallel to near edge 122, marks the position of imaging device 110. In terms of coordinate system 139, device position line 111 is parallel to the x-axis, with a y-coordinate of 0. To calculate $\pi_{RW}$, a section 137 of portion 120 is imaged by imaging device 110 to produce image 138. Section 137 includes two lines, the distances of which from device position line 111, in the y-direction, are known a priori. For example, as shown in FIG. 6, section 137 includes near edge 122, which is marked by a line 125, and center-line 124. The distance in the y-direction DEL between imaging device 110 and line 125 is known a priori, as is the distance in the y-direction DCL between imaging device 110 and center-line 124. In other embodiments, section 137 may include a different pair of lines, e.g., center-line 124 and line 127, which marks the far edge 123 of travel surface 102.

As shown in FIG. 6, image 138 contains the image lines 140 and 142, which correspond to lines 124 and 125, respectively. Image lines 140 and 142 may be detected manually or automatically, e.g., using a robust algorithm such as the Hough Transform Lines Detector algorithm (U.S. Pat. No. 3,069,654). Three image points q1, q2, and q3 are selected manually or automatically, such that two of the image points lie on one of the image lines 140 and 142, and the other image point lies on the other image line. For example, as shown in FIG. 6, q1 and q2 lie on image line 142, and q3 lies on image line 140. Each of the points Q1, Q2, and Q3, which correspond to q1, q2, and q3, respectively, is then determined by inverse projection. As described hereinabove, use of the inverse projection formula requires that the point Q lie on a plane with known equation π. In terms of coordinate system 139, Q1 and Q2 lie on the plane y=DEL, which is denoted by the vector $\pi_{Edge}=(0\ 1\ 0-DEL)^T$. Similarly, Q3 lies on the plane y=DCL, which is denoted by the vector $\pi_{Ctr}=(0\ 1\ 0-DCL)^T$. By substituting $\pi_{Edge}$ or $\pi_{Ctr}$ for π in the inverse projection formula, the points Q1, Q2, and Q3 are identified. Then, $\pi_{RW}$ is determined from Q1, Q2, and Q3, using the technique described hereinabove with respect to the determination of $\pi_{LASER}$ (FIG. 4).

Reference is again made to FIG. 2, which shows a system 300 for travel surface contaminant management. System 300 comprises at least one detector (e.g., foreign object detector 202) configured to detect the height of contaminant 104 (e.g., using the techniques described hereinabove) and the temperature of the contaminant and/or of the travel surface. (As described hereinabove with reference to FIG. 1, detector 202 typically comprises a remote temperature sensor such as an infrared-based temperature sensor 115, configured to remotely sense the temperature of travel surface 102 and/or of contaminant 104.) Also shown in FIG. 2 is display unit 109, comprising one or more screens 103. Display unit 109 is configured to simultaneously display the detected height and detected temperature on a single one of screens 103. Typically, as described above with reference to FIG. 5, detector(s) detect the height and temperature at several distinct locations along travel surface 102, and display unit 109 shows statistical parameters related to the detected heights and temperatures, such as average, standard deviation, minimum, maximum, etc.

Display unit 109 may be located, for example, in a control tower 101. Detector 202 communicates the detected characteristics of contaminant 104 to display unit 109, typically in real time, and typically via computer 130. An air traffic controller 105 may then estimate the friction on travel surface 102, and report the friction to airplane cockpits and/or determine the need for clearance of contaminant 104. In some embodiments, display unit 109 is further configured to display an image of the contaminant (e.g., an image captured by illumination and imaging device 106) on the single screen, simultaneously with the height and temperature.

Figure 8:
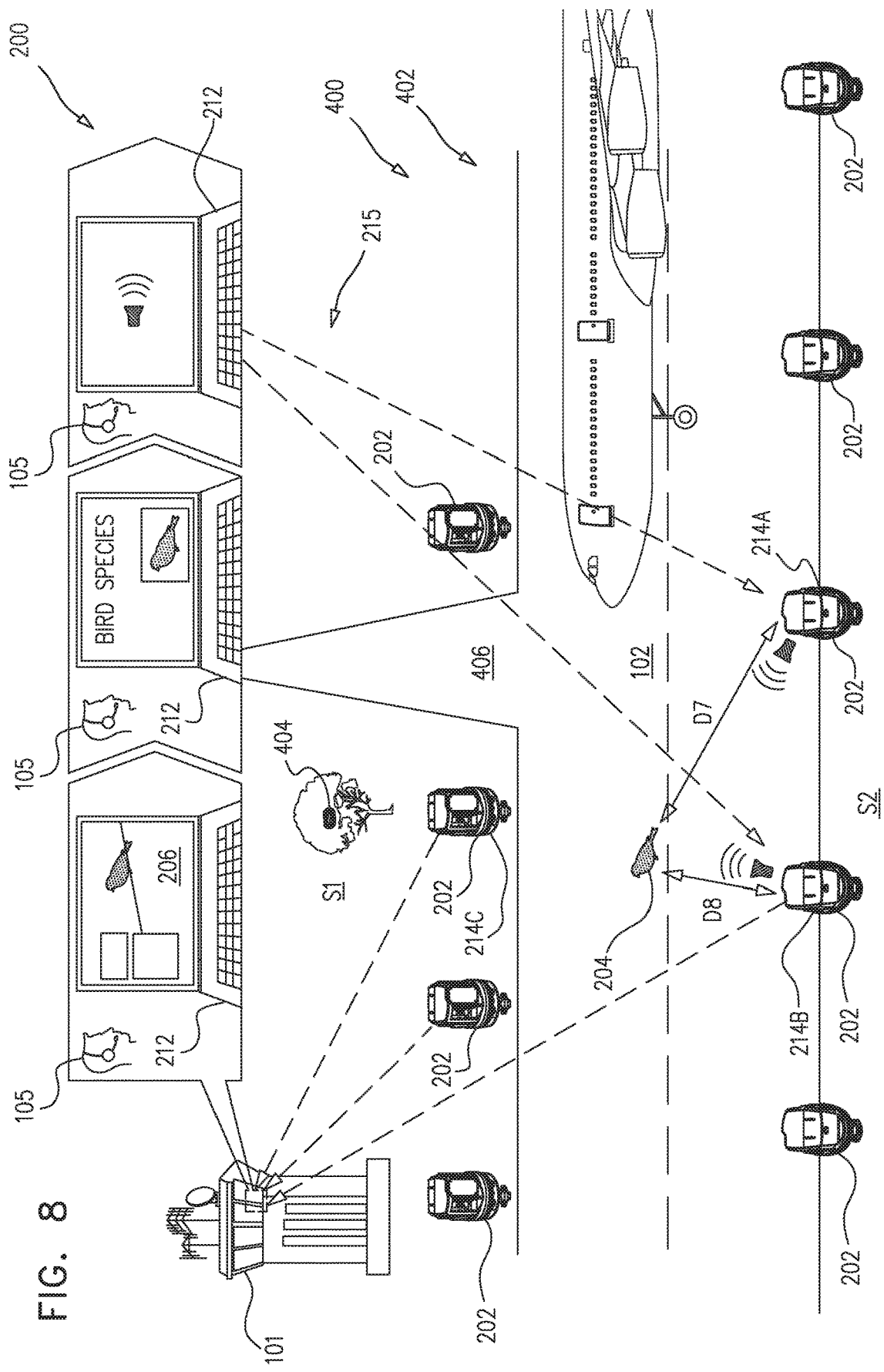
FIG. 8 is a schematic illustration of a system for airport bird management, in accordance with some embodiments of the present invention.
Figure 9:
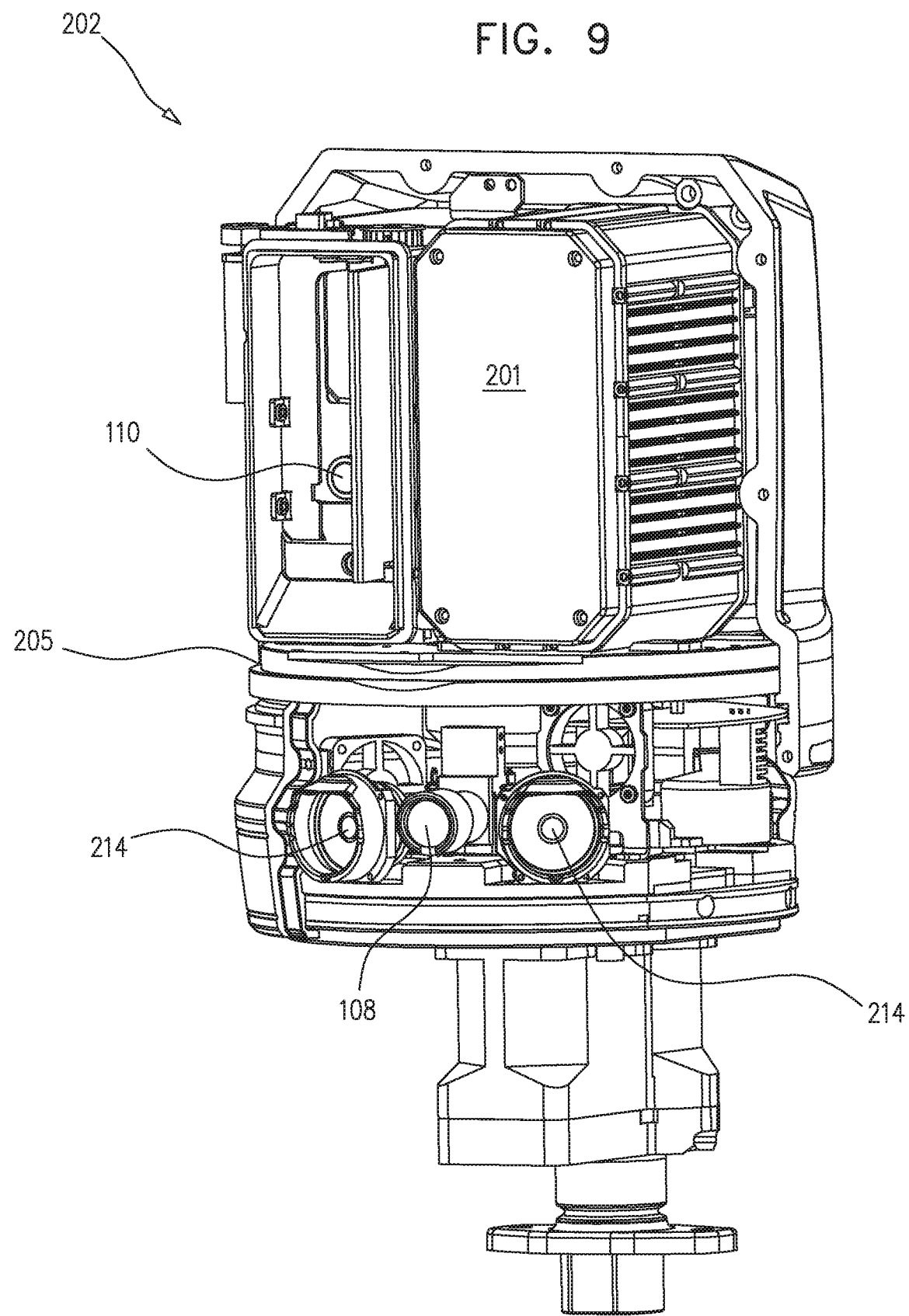
FIG. 9 is a schematic illustration of a foreign object detector, in accordance with some embodiments of the present invention.

Reference is now made to FIG. 8, which is a schematic illustration of a system 200 for airport bird management, in accordance with some embodiments of the present invention. System 200 comprises one or more foreign object detectors 202 (e.g., airport-travel-surface-foreign-object detectors 202) configured to detect the presence of a candidate bird 204 on travel surface 102, and a computer 212. (Computer 212 may include, and/or may be included by, computer 130, described hereinabove with reference to FIG. 2, FIG. 3, etc.) Reference is also made to FIG. 9, which is a schematic illustration of a foreign object detector 202, in accordance with some embodiments of the present invention. (Elements of FIG. 9 have already been shown in FIGS. 1A-B.) As shown in FIG. 9, each detector 202 includes an imaging device 110, described hereinabove with reference to FIGS. 1A-B, and a radar 201, disposed together on a rotating head 205. Imaging device 110 acquires images of candidate bird 204, and radar 201 measures the distance of candidate bird 204 from detector 202. (The measured distance is used to facilitate the extraction of features of candidate bird 204, such as height and width, which are used for cascade filtering, as described hereinbelow.) Each detector also includes illumination device 108, described hereinabove with reference to FIGS. 1A-B, and a deterrence device 214, comprising, for example, one or more speakers.

Detectors 202 detect the presence of candidate bird 204, typically by optically imaging at least one image 206 of the candidate bird using imaging device 110. Typically by processing image 206, computer 212 then validates a bird detection, by ascertaining that candidate bird 204 is a detected bird. (In the remainder of the specification, reference number 204 may be used to denote either the detected bird or the original candidate bird.) Following or together with the validation, and typically by processing image 206, computer 212 further classifies candidate bird 204 as to type (e.g., species) of bird. In response to the validation and classification, computer 212 institutes bird-classification-based bird deterrence, typically by communicating deterrence instructions 215 to one or more airport-travel-surface-foreign-object detectors 202 equipped with deterrence functionality (e.g., detectors 202 comprising deterrence devices 214). Typically, the institution of bird-classification-based bird deterrence is further in response to a human operator (e.g., air traffic controller 105) issuing a command to computer 212 to communicate the deterrence instructions. Deterrence instructions 215 are based on the bird classification; for example, they may include instructions to play the sound of a predator specific to the species of detected bird. In response to the instructions, deterrence devices 214 of detectors 202 deter detected bird 204, e.g., via audio and/or visual stimulation, from remaining on travel surface 102, thus typically causing the bird to leave travel surface 102.

In some embodiments, detectors 202 further provide feedback to air traffic controller 105, such that, if necessary, further deterrence may be instituted. For example, imaging device 110 may continue to image bird 204 on travel surface 102, and air traffic controller 105 may issue a second command to computer 212 to institute deterrence, in response to viewing the image from imaging device 110. Upon such a second institution of deterrence, computer 212 may automatically communicate deterrence instructions 215 that are different from the first deterrence instructions. For example, the second deterrence instructions may include instructions to play a sound that is different from the sound that was played daring the first deterrence attempt.

In some embodiments, computer 212 is disposed remotely from detectors 202, e.g., in control tower 101, as shown in FIG. 8. In other embodiments, computer 212 is disposed adjacent to or inside one or more of the detectors. The scope of the present invention also allows for computer 212 to comprise two or more separate computational units disposed in various locations, each of which performs one or more distinct tasks. For example, a unit adjacent to or inside one or more of the detectors may perform validation and classification, while a unit in control tower 101 may be used in instituting deterrence.

Typically, system 200 comprises a plurality of airport-travel-surface-foreign-object detectors 202, and outputs of the plurality of detectors are used by computer 212 to validate a bird detection. The use of a plurality of detectors 202 generally facilitates better coverage of travel surface 102, relative to if only one detector 202 would be used. Furthermore, using a plurality of detectors, a candidate bird 204 can be imaged from multiple angles, thus facilitating the validation of the bird detection and classification of the bird by providing computer 212 with more data.

Figure 10:
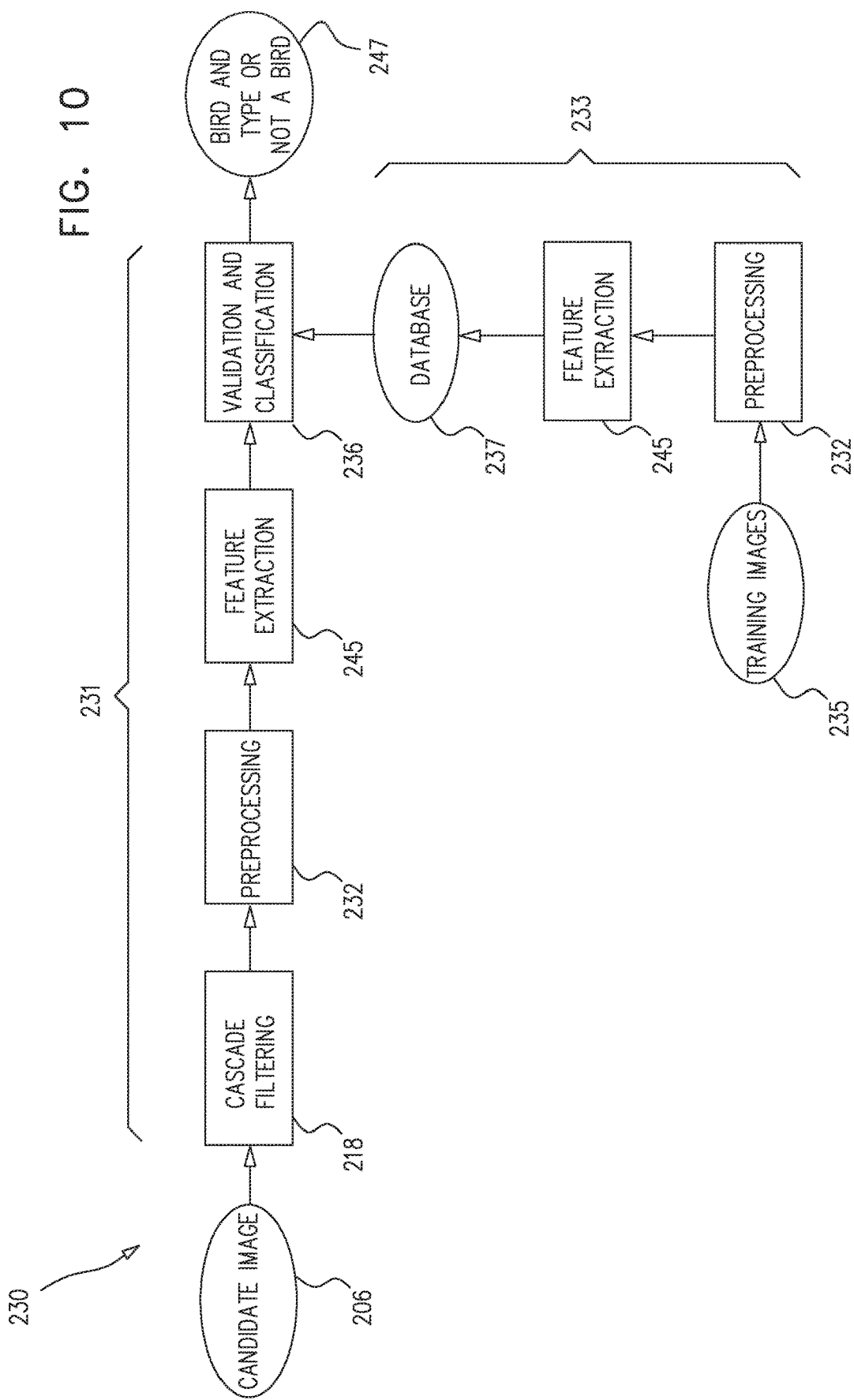
FIG. 10 is a flow chart of a bird-detection validation algorithm, in accordance with some embodiments of the present invention.

Reference is now made to FIG. 10, which is a flow chart of a bird-detection validation algorithm 230 operating on image 206, in accordance with some embodiments of the present invention. FIG. 10 shows a main branch 231 and a secondary branch 233 of algorithm 230. Main branch 231 comprises steps that are performed, typically in real-time, to validate a bird detection and classify the bird by type; these steps, each of which is described hereinbelow, include:
(i) Application of a cascade filtering algorithm 218
(ii) Application of a preprocessing algorithm 232
(iii) Application of a feature extraction algorithm 245
(iv) Application of a validation and classification algorithm 236

The output 247 of main branch 231 is a validation of a detection of a bird and a classification of the detected bird, or alternatively, an ascertaining that candidate bird 204 is not actually a bird.

Secondary branch 233 comprises steps that are typically performed offline, i.e., not in real-time, in order to facilitate the operation of validation and classification algorithm 236. A set 235 of training images is fed to secondary branch 233. Set 235 typically includes images of birds of various types and in various poses, as well as images of non-birds. Secondary branch 233 comprises the following steps:

(i) The bird images in set 235 are preprocessed, e.g., using preprocessing algorithm 232, which is described hereinbelow with respect to main branch 231. Preprocessing of the bird images in set 235 "normalizes" the images by removing shadows, orienting side-facing birds in a common orientation (e.g., left-facing) and scaling the bird images to a common scale.

(ii) Feature descriptors are extracted from the training images of set 235, e.g., using feature extraction algorithm 245, described hereinbelow.

(iii) The feature descriptors are stored in a computerized bird feature database 237. Database 237 is typically used by algorithm 236 for validation and classification, as described in more detail hereinbelow.

Figure 11:
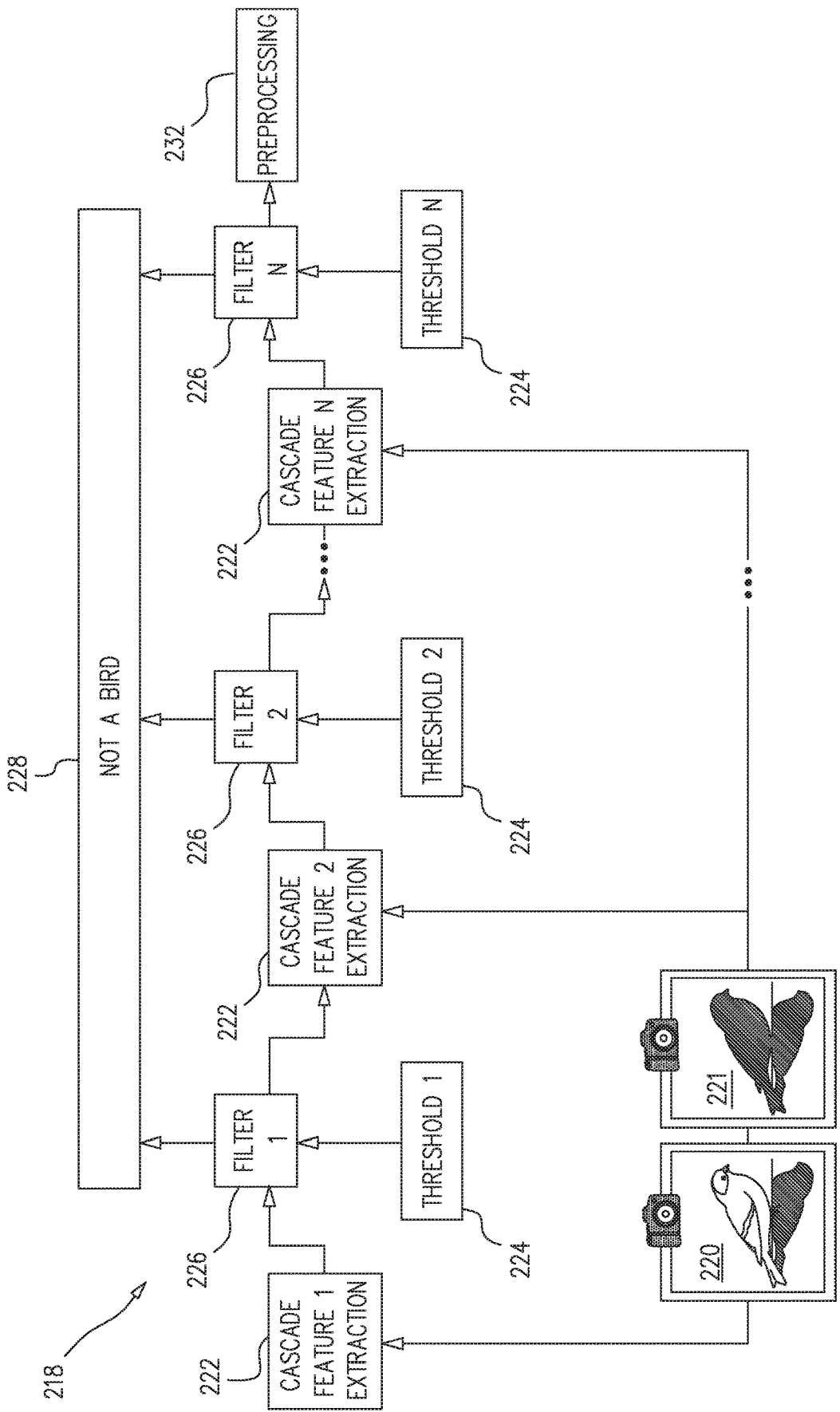
FIG. 11 is a flow chart of a cascade filtering algorithm, in accordance with some embodiments of the present invention.

Reference is now made to FIG. 11, which is a flow chart of a cascade filtering algorithm 218, in accordance with some embodiments of the present invention. In some embodiments, computer 212 employs cascade filtering algorithm 218 in validating a bird detection. As shown in FIG. 11, algorithm 218 operates on a gray-level image 220 and/or a binary image 221 of candidate bird 204, each of which is derived from image 206 (FIG. 8). (Binary image 221 may be created, for example, by finding a connected component of pixels that change by at least a given threshold over two or more consecutive frames, and using the connected component as a mask.) It is noted that the scope of the present invention allows for operating on color images in place of or in addition to gray-level images, mutatis mutandis.

Algorithm 218 utilizes a cascade of N feature extractors 222, each of which extracts a feature descriptor from the gray-level and/or binary image. The extracted feature descriptors may include, for example, dimensions of candidate bird 204 such as height and/or width, a ratio of dimensions, and/or another function of one or more dimensions. Each feature descriptor is passed to a filter 226, which compares the feature descriptor with a threshold 224. If the feature descriptor does not pass threshold 224, algorithm 218 decides that candidate bird 204 is not a bird, as shown in decision step 228, and algorithm 218 terminates. If the image(s) pass each of the N filters, algorithm 218 terminates, and the image(s) are passed to the next step in main branch 231 of bird-detection validation algorithm 230, e.g., application of preprocessing algorithm 232.

Figure 12:
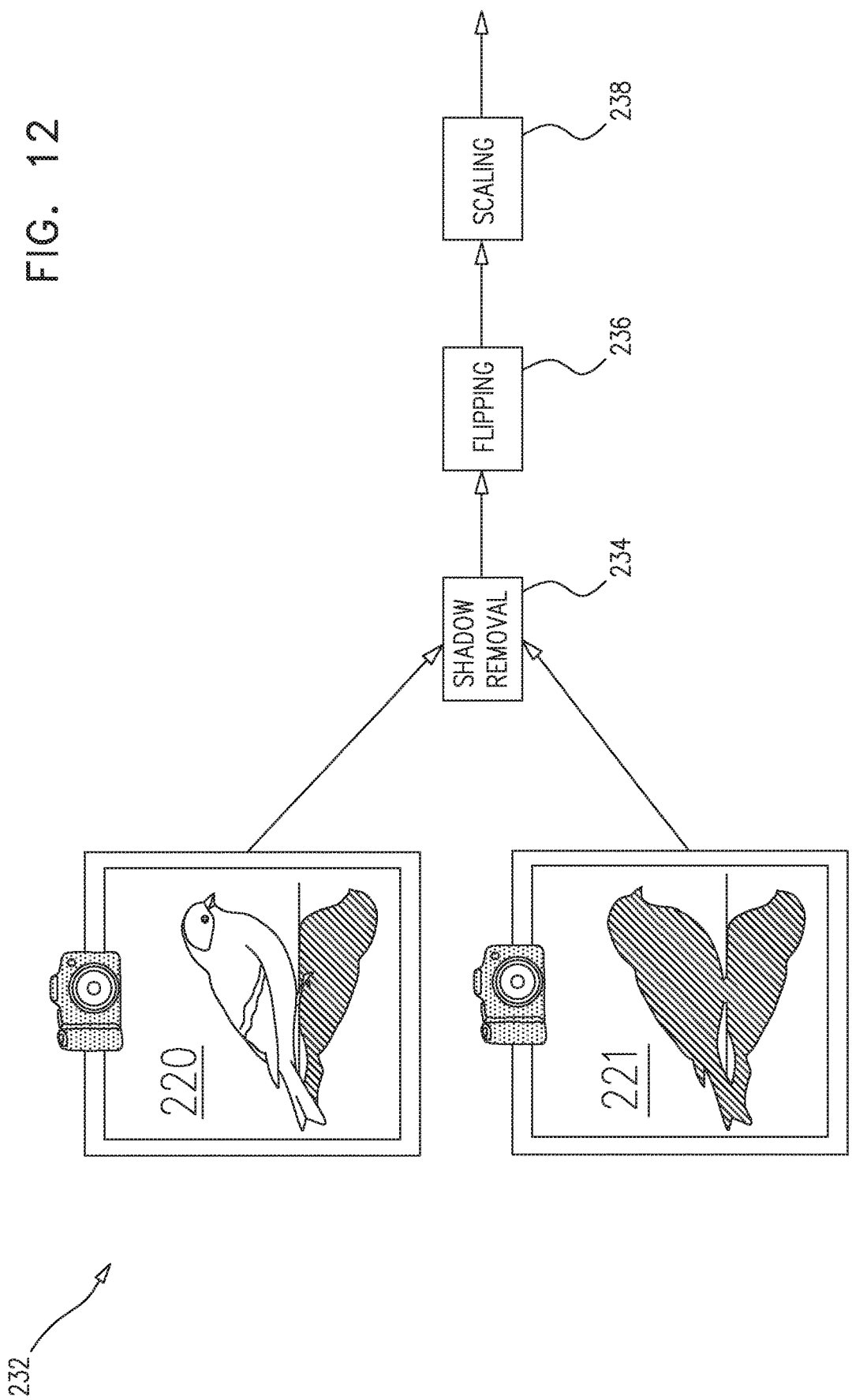
FIG. 12 is a flow chart of a preprocessing algorithm, in accordance with some embodiments of the present invention.

Reference is now made to FIG. 12, which is a flow chart of preprocessing algorithm 232, in accordance with some embodiments of the present invention. In some embodiments, computer 212 employs preprocessing algorithm 232 in validating a bird detection. Preprocessing algorithm 232 operates on gray-level image 220 and/or binary image 221 of candidate bird 204, and includes at least one of the following processes, each of which is described in detail hereinbelow:

(i) Execution of a shadow removal algorithm 234
(ii) Execution of a flipping algorithm 236
(iii) Scaling 238 of the image(s)

Figure 13:
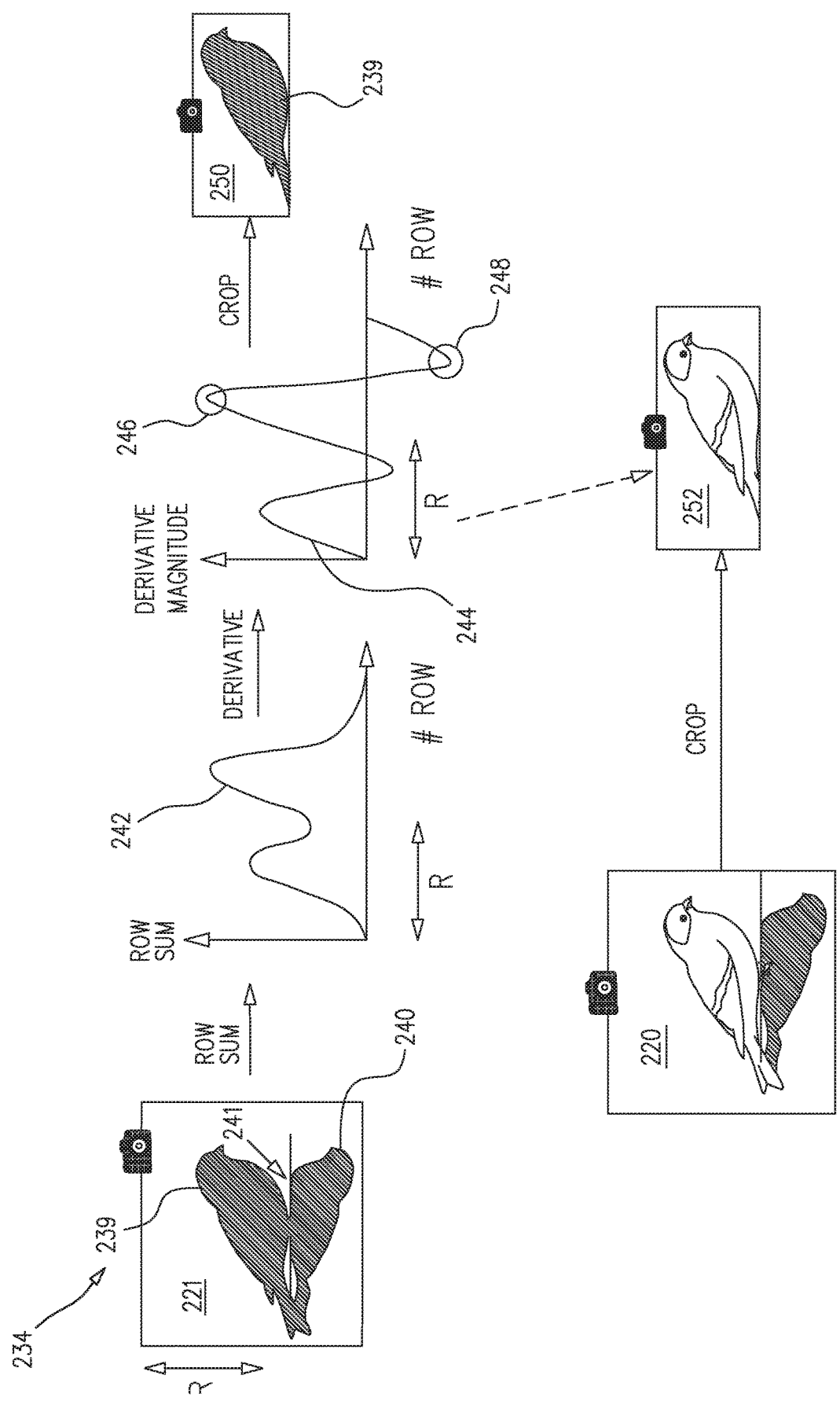
FIG. 13 is a flow chart of a shadow removal algorithm, in accordance with some embodiments of the present invention.

Reference is now made to FIG. 13, which is a flow chart of shadow removal algorithm 234, in accordance with some embodiments of the present invention. Shadow removal algorithm 234 operates on binary input image 221, where binary input image 221 contains a single blob 241 comprising a candidate bird image 239 conjoined with a shadow image 240. The following description assumes that background pixels are black, i.e., they have a value of zero, and blob pixels are white, i.e., they have a value of one. (This implies that image 221, as shown in FIG. 13, is first inverted before being operated on by algorithm 234. Regardless, it is noted that the algorithm can be easily modified such that it operates on a black blob on a white background.)

Shadow removal algorithm 234 begins by summing the rows of binary input image 221 to create a row-sum function 242. A derivative 244 of row-sum function 242 is then calculated. The algorithm then finds the location of a maximum 246 and a minimum 248 of derivative 244, the maximum and minimum satisfying the following criteria:

(i) Maximum 246 and minimum 248 each correspond to rows which are in a lower portion of image 221, i.e., they do not correspond to rows which belong to the top R rows of image 221.

(ii) Maximum 246 is left of minimum 248, i.e., the row to which maximum 246 corresponds is above the row to which minimum 248 corresponds.

(iii) Maximum 246 and minimum 248 are each greater in absolute value than a predetermined threshold.

Algorithm 234 then removes shadow image 240 by cropping image 221 at or near the row which corresponds to maximum 246. (This is, generally, the row at which the background between the bird and the shadow meets the edge of the shadow.) Image 221 is also cropped near the top, right, and left boundaries of blob 241. Gray-level image 220 is cropped at the same locations as binary image 221. The output of algorithm 234 is a cropped binary image 250 and a cropped gray-level image 252. If no maximum and minimum satisfying the above criteria are found, images 220 and 221 are cropped near the top, right, left, and bottom boundaries of blob 241.

Figure 14:
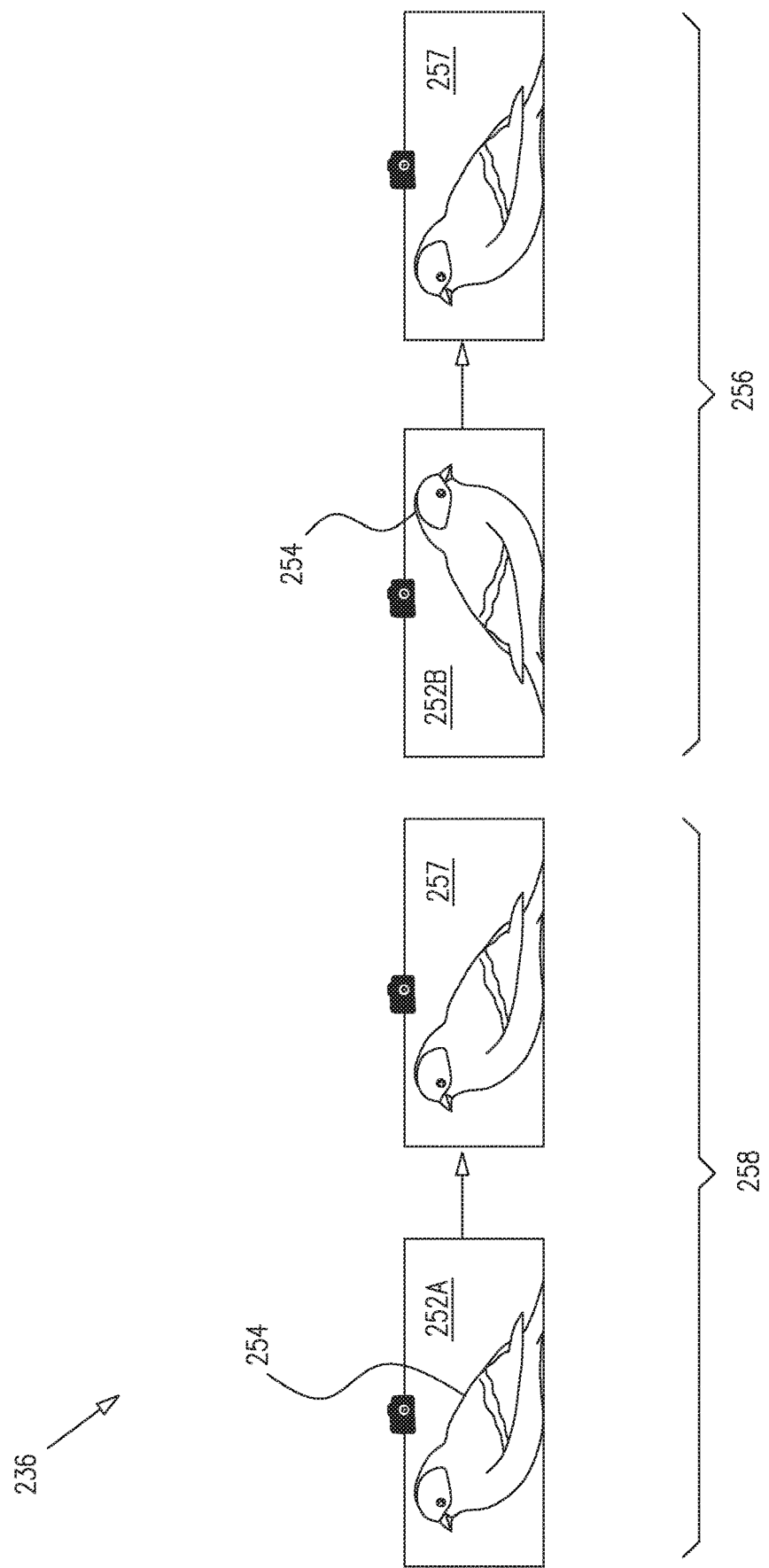
FIG. 14 is a schematic illustration of the operation of a flipping algorithm, in accordance with some embodiments of the present invention.

Reference is now made to FIG. 14, which is a schematic illustration of the operation of flipping algorithm 236, in accordance with some embodiments of the present invention. Flipping algorithm 236 typically operates on cropped gray-level image 252, which contains an image 254 of candidate bird 204. (FIG. 14 shows two separate instances of image 252, namely, image 252A and image 252B.) Flipping algorithm 236 facilitates comparison between feature descriptors of the image of the candidate bird and feature descriptors stored in database 237 (FIG. 10), by orienting side-facing birds in a single orientation, e.g., such that they are all left-facing. If an image 252B shows candidate bird image 254 facing to the right, flipping algorithm 236 flips image 252B left-to-right, as shown in scenario 256. If an image 252A shows candidate bird image 254 facing to the left, the algorithm does not operate on the image, as shown in scenario 258. In either scenario, the output of the algorithm is an image 257 in which candidate bird image 254 is shown facing to the left.

Figure 15:
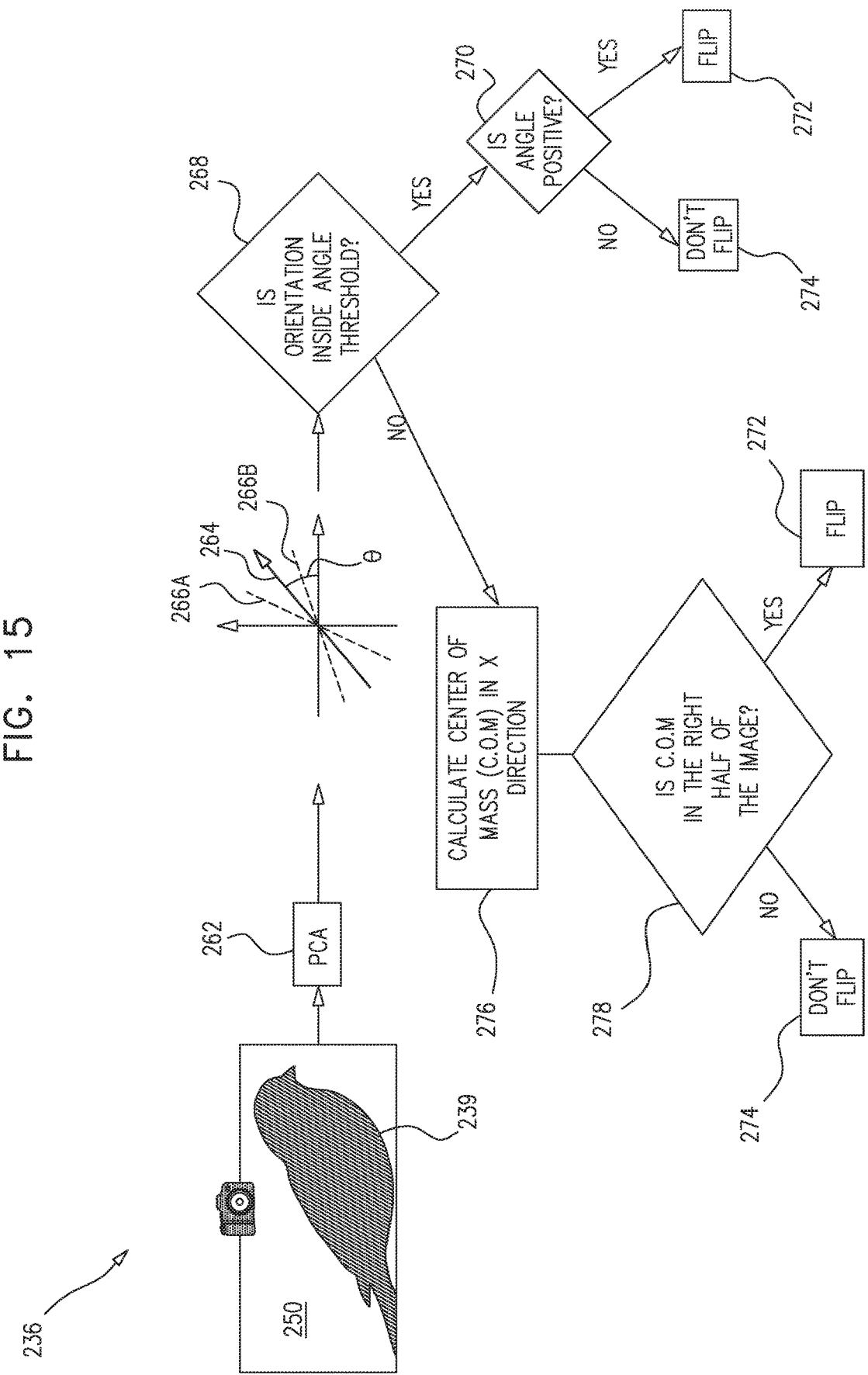
FIG. 15 is a flow chart of an image flipping algorithm, in accordance with some embodiments of the present invention.

Reference is now made to FIG. 15, which is flow chart of image flipping algorithm 236, in accordance with some embodiments of the present invention. The flow chart shows the steps that are executed by flipping algorithm 236, in some embodiments, to determine whether input image 252 (FIG. 14) should be flipped. Although the description below assumes that the desired output of algorithm 236 is a left-facing bird image, as shown in FIG. 14, the algorithm can also be applied to scenarios in which the desired output is a right-facing bird image, mutatis mutandis.

Algorithm 236, in a PCA step 262, first applies Principal Component Analysis (PCA) to cropped binary image 250 in order to determine the principal axis 264 of candidate bird image 239. The algorithm, in an orientation-determining step 268, then determines whether the angle theta, which describes the orientation of principal axis 264, falls within a range of angles indicative of side-facing bird. For example, the range of angles might be between 15 and 75 degrees for a right-facing bird, as generally indicated by dashed lines 266A and 266B in FIG. 15, and between −15 and −75 degrees (not shown) for a left-facing bird. (The latter range is equivalent to a range of between 105 and 165 degrees, inasmuch as birds are not typically imaged upside-down.) If theta falls within either of the ranges, the algorithm, in a second orientation-determining step 270, determines if theta is positive (i.e., if it is between 0 and 90 degrees). A positive angle theta is indicative of a right-facing bird image; therefore, if theta is positive, the algorithm, in a flipping step 272, flips images 250 and 252. If theta is negative (i.e., it is between 0 and −90 degrees), the algorithm, in a non-flipping step 274, does not flip the images.

It is possible that candidate bird 204 is side-facing, but in a manner such that the orientation of principal axis 264 does not fall within a range of angles indicative of a side-facing bird; for example, the bird might be turned only slightly to the side. In such scenarios, as shown in FIG. 15, a different method is used to determine the orientation of candidate bird 204. In a center-of-mass calculation step 276, the algorithm calculates the center of mass of image 250 in the horizontal direction. Then, at a center-of-mass location determination step 278, the algorithm determines if the center of mass is in the right half of the image, such that candidate bird 204 may be assumed to be right-facing. If the center of mass is in the right half of the image, flipping step 272 is executed. Otherwise, non-flipping-step 274 is executed.

Figure 16:
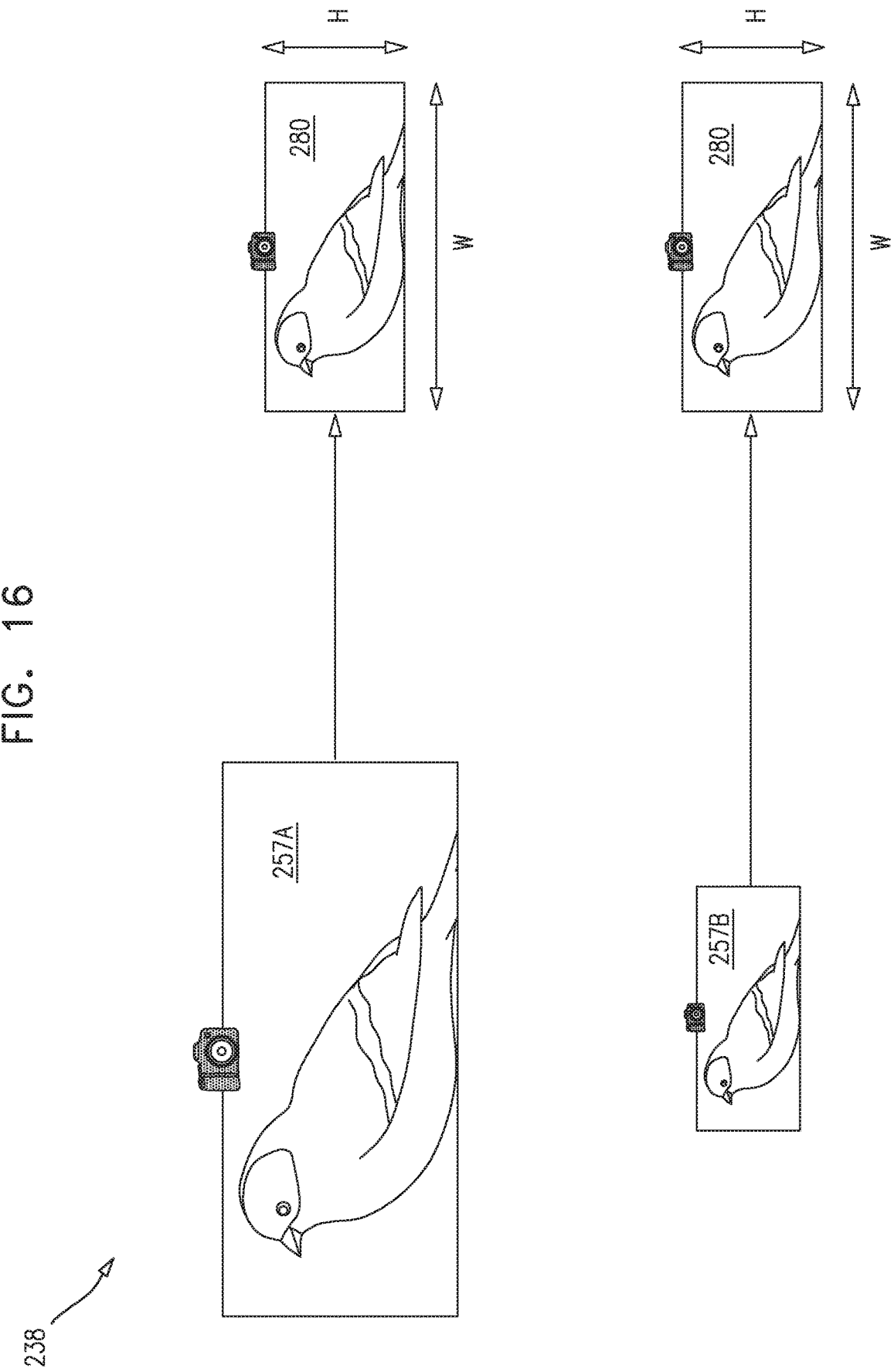
FIG. 16 is a schematic illustration of the operation of a scaling algorithm, in accordance with some embodiments of the present invention.

Reference is now made to FIG. 16, which is a schematic illustration of the operation of scaling algorithm 238, in accordance with some embodiments of the present invention. Scaling algorithm 238 typically operates on output image 257 of flipping algorithm 236 (FIG. 14), scaling the image to a uniform size in order to facilitate comparison between feature descriptors of the candidate bird and feature descriptors stored in database 237 (FIG. 10). FIG. 16 shows two instances of image 257, namely, a relatively large image 257A and a relatively small image 257B, each being uniformly scaled to be of size H×W. (In some embodiments, the ratio of height H to width W may also be changed by scaling algorithm 238.) The output of scaling algorithm 238 is a scaled image 280.

Figure 17:
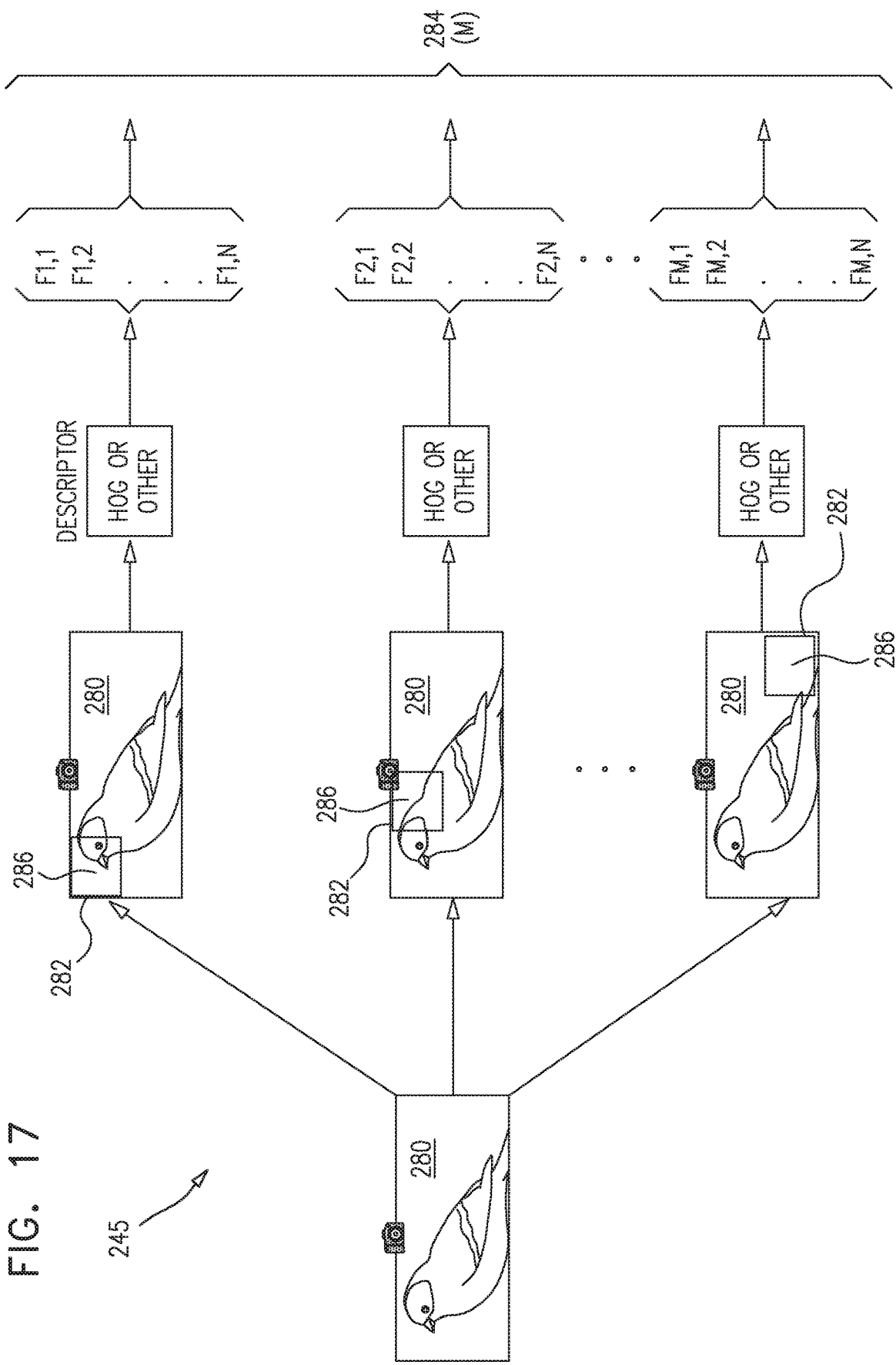
FIG. 17 is a flow chart of a feature extraction algorithm, in accordance with some embodiments of the present invention.

Reference is now made to FIG. 17, which is a flow chart of feature extraction algorithm 245, in accordance with some embodiments of the present invention. Feature extraction algorithm 245 applies a sliding window 282 to scaled image 280, the sliding window alternatingly enclosing M sub-blocks 286 of image 280. (in some embodiments, sub-blocks 286 may overlap one another.) For each sub-block 286, a set of N feature descriptors is extracted, such that group 284 of feature descriptors comprises a total of N×M feature descriptor elements. The extracted feature descriptors may comprise, for example, a Histogram of Oriented Gradients (HOG), described in Dalal, Navneet, and Triggs, "Histograms of oriented gradients for human detection," Computer Vision and Pattern Recognition, 2005. In some embodiments, as shown in FIG. 17, feature extraction algorithm 245 operates on scaled image 280. In other embodiments, scaling algorithm 238 is not applied, and feature extraction algorithm 245 operates on output image 257 of flipping algorithm 236 (FIG. 14). In such embodiments, feature extraction algorithm 245 typically extracts scale-invariant feature descriptors, such as by applying the Scale Invariant Feature Transform (SIFT), described in U.S. Pat. No. 6,711,293.

Figure 18:
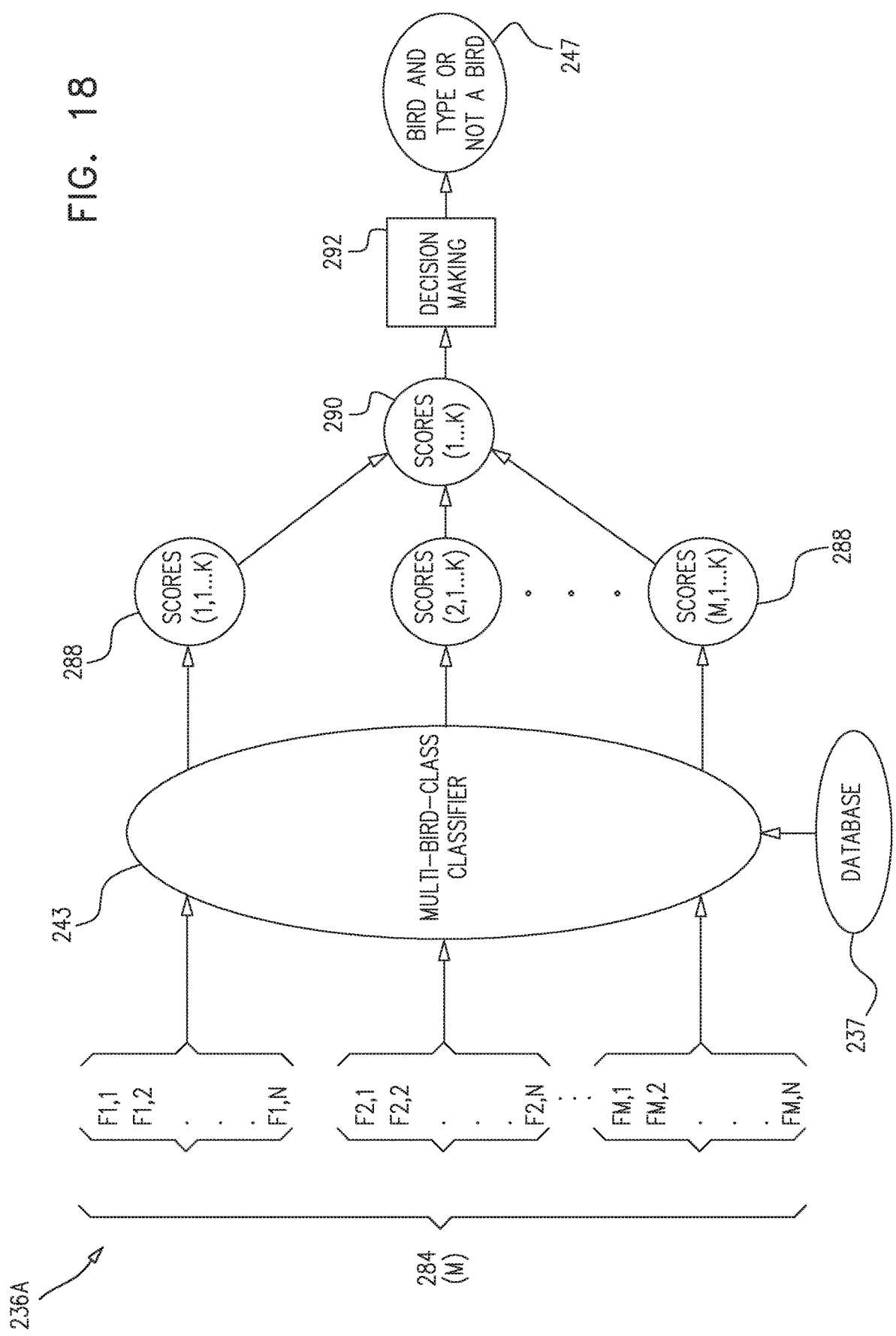
FIGS. 18-19 are flow charts of a validation and classification algorithm, in accordance with some embodiments of the present invention.
Figure 19:
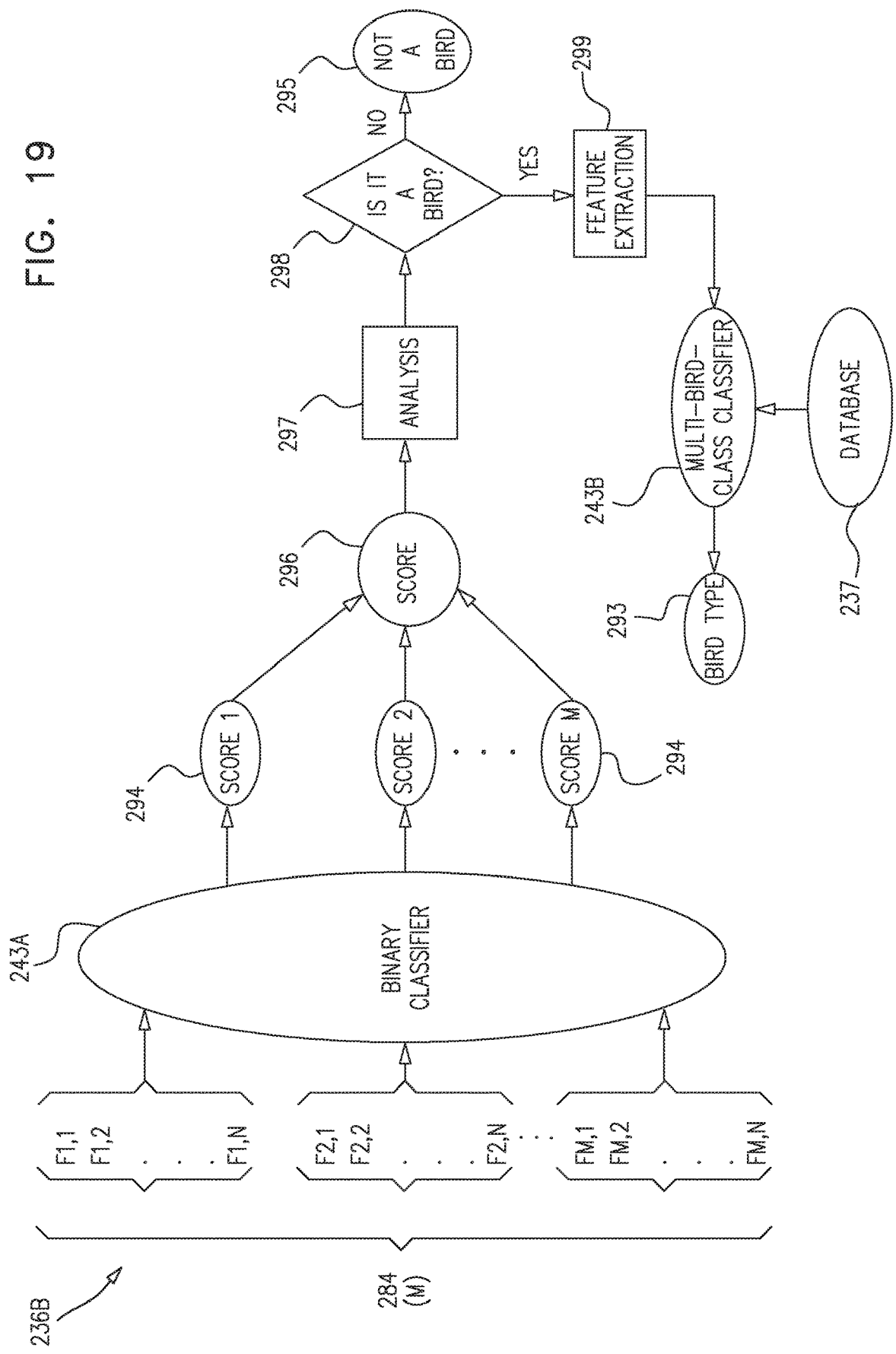

Reference is now made to FIGS. 18-19, which are flow charts of validation and classification algorithm 236, in accordance with some embodiments of the present invention. FIG. 18 shows algorithm 236A, which is a version of validation and classification algorithm 236 in which a single multi-bird-class classifier 243 is used for both validation of a bird detection and classification as to type (e.g., species) of bird. In the context of the claims and specification of the present patent application, a multi-bird-class classifier is a classifier that classifies a bird as to one of a plurality of classes and/or types. For example, a multi-bird-class classifier may classify a bird as belonging to one of a plurality of species, e.g., "pigeon", and/or may classify the bird more generally, e.g., "bird that is preyed on by hawks". A multi-bird-class classifier differs from a binary classifier at least in that a binary classifier classifies a candidate bird as a "bird" or "non-bird", but does not classify the bird as to type of bird.

Classifier 243 operates on group 284 of feature descriptors. For each of the M sub-blocks 286 (FIG. 17), classifier 243 generates a set 288 of one or more scores, e.g., K scores, where K is the number of bird types contained in set 235 of training images (FIG. 10), Each score represents a measure, e.g., a likelihood, that the portion of candidate bird 204 contained in the given sub-block belongs to a bird of a particular type. Typically, classifier 243 calculates the scores by comparing the feature descriptors in group 284 with feature descriptors stored in computerized bird feature database 237 (FIG. 10), e.g., using machine-learning techniques. The M sets 288 of scores are combined to yield a combined set 290 of scores, where each score represents a measure, e.g., a likelihood, that candidate bird 204 is a bird of a particular type. A decision-making step 292 then analyzes the highest score in combined set 290, e.g., by comparing it against a given threshold. The output 247 of decision-making step 292, also described above with reference to FIG. 10, is a validation of a detection of a bird and a classification of the detected bird, or alternatively, an ascertaining that candidate bird 204 is not actually a bird.

FIG. 19 shows algorithm 236B, which is a second version of validation and classification algorithm 236. In algorithm 236B, group 284 of feature descriptors is first passed to a binary classifier 243A. For each of the M pixel sub-blocks, binary classifier 243A generates a score 294 which represents a measure, e.g., a likelihood, that the portion of candidate bird 204 contained in the given sub-block belongs to a bird. Typically, classifier 243 calculates the scores by comparing the feature descriptors in group 284 with feature descriptors stored in computerized bird feature database 237, e.g., using machine-learning techniques. The M scores are combined to yield a combined score 296, which represents a measure, e.g., a likelihood, that candidate bird 204 is a bird. An analysis step 297 then analyzes combined score 296, e.g., by comparing it against a given threshold. Based on this analysis, a decision-making step 298 validates a bird detection by ascertaining that candidate bird 204 is a detected bird, or alternatively, does not validate a bird detection. In the latter case, algorithm 236B outputs a decision 295 that candidate bird 204 is not a bird. In the former case, algorithm 236B classifies the detected bird as to type of bird. In some embodiments, as shown in FIG. 19, classification is preceded by a second feature-extraction step 299, in which group 284 is augmented by additional feature descriptors. The augmented set of feature descriptors is passed to a multi-bird-class classifier 243B, which operates generally as described above with respect to classifier 243 (FIG. 18). Typically, classifier 243B classifies the bird detected as to type of bird by comparing the feature descriptors in group 284 with feature descriptors stored in computerized bird feature database 237, e.g., using machine-learning techniques. Following the classification, algorithm 236B outputs the bird type 293 of bird 204.

Reference is again made to FIG. 8, which shows a method 400 of deterring an animal from remaining on travel surface 102. Although FIG. 8 shows, and the description below refers to, bird 204 as the deterred animal, method 400 may also be used to deter other types of animals, mutatis mutandis.

Method 400 comprises using a first deterrence device 214A, which is disposed at a first distance D7 from bird 204, to simulate a deterring entity by emitting a first deterrence sound of the deterring entity. For example, the simulated deterring entity may be a predator of bird 204, the first deterrence sound being a simulated or recorded call of the predator. Alternatively, for example, the simulated deterring entity may be a vehicle, the first deterrence sound being a simulated or recorded sound of the vehicle. Following the emitting of the first deterrence sound, a second deterrence device 214B, which is disposed at a second distance D8 from bird 204 that is less than D7, is used to emit a second deterrence sound of the deterring entity. For example, a second simulated or recorded call of the simulated predator may be emitted. (The second deterrence sound may be different from the first deterrence sound.) Emitting the second deterrence sound following the emitting of the first deterrence sound, and using the deterrence device 214B that is closer to the animal, has the effect of simulating an approach toward bird 204 of the deterring entity.

Method 400 is typically practiced together with at least some of the methods and apparatus described hereinabove, with reference to FIGS. 8-19. For example, at least one detector 202 may be used to detect bird 204, and computer 212 may be used to validate the detection, as described hereinabove. In some embodiments, computer 212 further classifies a detected bird 204 as to type of bird, using the techniques described hereinabove, and institutes bird-classification-based bird deterrence by driving the first and second deterrence devices to emit (respectively) first and second deterrence sounds that are bird-classification-specific. For example, the first and second deterrence sounds may be sounds of a predator that is specific to the type (e.g., species) of detected bird. In other embodiments, computer 212 does not classify the detected animal, and drives the first and second deterrence devices to emit (respectively) first and second deterrence sounds that are not specific to the type of animal, e.g., sounds of an approaching vehicle.

FIG. 8 also shows a method 402 of deterring an animal from remaining on a travel surface 102 having a plurality of sides S1 and S2. Although FIG. 8 shows, and the description below refers to, bird 204 as the deterred animal, method 402 may also be used to deter other types of animals, mutatis mutandis.

Method 402 comprises using computer 212 on which is stored a set of rules. Based on the stored set of rules, computer 212 identifies one of sides S1 and S2 to which bird 204 is to be driven. For example, the stored set of rules may dictate that bird 204 is to be driven to S1, rather than S2, given that a lair 404 (e.g., a nest) of bird 204 is located at S1. (As noted above, method 402 may be used to deter various types of animals, such that the word "lair" should be understood in this context to generally denote any dwelling place of an animal, be it a nest, den, hole, or other type of dwelling place.) Since bird 204 is expected to return to lair 404 in any case, driving the bird to S1 reduces the chances of the bird returning to travel surface 102, relative to driving the bird to S2. In response to the identifying of S1, computer 212 selects a subset of a plurality of deterrence devices to deter bird 204. For example, computer 212 may select a deterrence device 214A and/or a deterrence device 214B, which (both together and separately) are a subset of all of the deterrence devices 214 included in detectors 202 (FIG. 9). Since deterrence devices 214A and 214B face S1, using one or both of these devices for deterrence will typically result in bird 204 being driven to S1. (On the other hand, a deterrence device 214C is not selected, since it faces S2.) Computer 212 communicates deterrence instructions 215 to deterrence device 214A and/or deterrence device 214B, and in response to the instructions, the deterrence device(s) s/are used to deter bird 204 from remaining on travel surface 102.

The stored set of rules may include rules pertaining to the location of other travel surfaces relative to travel surface 102. For example, the rules may dictate that bird 204 is to be driven to S2, rather than S1 (e.g., notwithstanding the presence of lair 404 at side S1), given that S1 is adjacent to another travel surface 406, whereas S2 is not adjacent to another travel surface. Based on the rules, computer 212 identifies S2, and communicates deterrence instructions to, for example, deterrence device 214C, which faces S2. In general, the stored set of rules may include rules pertaining to different types of animals (e.g., different species of birds), such that, for example, a pigeon is driven to S1, while a sparrow is driven to S2.

Method 402 is typically practiced together with at least some of the methods and apparatus described hereinabove, with reference to FIGS. 8-19. For example, at least one detector 202 may be used to detect bird 204, and computer 212 may be used to validate the detection, as described hereinabove. In some embodiments, using the techniques described hereinabove, computer 212 further classifies a detected bird 204 as to type (e.g., species) of bird, and institutes bird-classification-based bird deterrence by driving the selected subset of deterrence devices 214 to deter bird 204 in a bird-classification-specific way. For example, deterrence instructions 215 communicated by computer 212 may include instructions to emit the sound of a predator that is specific to the type of detected bird. In other embodiments, computer 212 does not classify the detected animal, and drives the selected subset of deterrence devices 214 to emit sounds that are not specific to the type of animal, e.g., sounds of an approaching vehicle. In some embodiments, method 402 is practiced in combination with method 400.

Embodiments of the image processing described herein can take the form of an entirely hardware embodiment, an entirely software embodiment or an embodiment including both hardware and software elements. In an embodiment, the invention is implemented in software, which includes but is not limited to firmware, resident software, microcode, etc.

Furthermore, the embodiments of the image processing can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

Examples of a tangible computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Typically, the operations described herein that relate to storing information to memory transform the physical state of the memory, which is a real physical article, to have a different magnetic polarity, electrical charge, or the like depending on the technology of the memory that is used.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. The system can read the inventive instructions on the program storage devices and follow these instructions to execute the methodology of the embodiments of the invention.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in any combination of one or more programming languages, including an object oriented programming language such as Java, Smalltalk, C++ or the like and conventional procedural programming languages, such as the C programming language or similar programming languages.

It will be understood that each block of the flowcharts shown in the figures, and combinations of blocks in the flowchart, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart blocks.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A system for automatically ascertaining at least a height characteristic of a contaminant on a travel surface, said system comprising:
    an illumination device, fixedly located in vicinity of at least a portion of a travel surface, configured to:
        illuminate said at least a portion of said travel surface with at least one light beam at a first time when said at least a portion of said travel surface is generally free of any contaminant, and
        illuminate said at least a portion of said travel surface with a light beam at a second time, different from said first time, when said at least a portion of said travel surface is covered by a layer of a contaminant;
    an imaging device, fixedly located in vicinity of said at least a portion of said travel surface, configured to:
        image, at said first time, at least one first-time impingement of said at least one light beam on said at least a portion of said travel surface, and
        image, at said second time, a second-time impingement of said at light beam on said at least a portion of said travel surface covered by said layer of said contaminant; and
    a computer configured to calculate at least said height characteristic of said contaminant on said travel surface, in response to said imaging of (a) said at least one first-time impingement, and (b) said second-time impingement;
    wherein said second-time impingement lies on a surface of said layer of said contaminant; and
    wherein said computer is configured to calculate at least said height characteristic of said contaminant on said travel surface, by calculating at least a distance between (a) said second-time impingement, and (b) a point on said travel surface that is closest to said second-time impingement;
    wherein said at least one light beam includes at least two light beams, said imaging device being configured to image first-time impingements of said at least two light beams at said first time, wherein, in response to said imaging at said first time, said computer is configured to ascertain an equation of a plane defined by said at least a portion of said travel surface, and wherein said computer is configured to, in response to said equation of said plane, calculate said distance between (a) said second-time impingement, and (b) said point on said travel surface that is closest to said second-time impingement.

2. The system according to claim 1, wherein said contaminant includes snow, and wherein said computer is configured to calculate at least said height characteristic of said snow.

3. The system according to claim 1, wherein said second-time impingement lies on said at least a portion of said travel surface, wherein said contaminant has a property selected from the group consisting of: transparency, and translucency, and wherein said computer is configured to calculate at least said height characteristic of said contaminant having said selected property.

4. The system according to claim 3, wherein said computer is further configured to identify values including:
    an impingement angle of said first-time impingement,
    an offset second-time impingement point on said travel surface, an angle between (a) a vector joining said illumination device and imaging device to said offset second-time impingement point, and (b) a normal to said travel surface at said offset second-time impingement point, an illumination angle of refraction at a surface of said contaminant, and an imaging angle of refraction at said surface of said contaminant, and wherein said computer is configured to calculate at least said height characteristic of said contaminant having said selected property, at least in response to identifying said values.

5. The system according to claim 3, wherein said contaminant includes liquid water, and wherein said computer is configured to calculate at least said height characteristic of said liquid water.

6. The system according to claim 1, wherein said computer is configured to ascertain, with respect to a coordinate system of said illumination device and said imaging device, an equation of a plane that is defined by said at least a portion of said travel surface, and wherein said computer is configured to calculate at least said height characteristic of said contaminant at least in response to said equation.

7. A method for automatically ascertaining at least a height characteristic of a contaminant on a travel surface, said method comprising:
using an illumination device, fixedly located in vicinity of at least a portion of a travel surface, to:
illuminate said at least a portion of said travel surface with at least one light beam at a first time when said at least a portion of said travel surface is generally free of any contaminant, and
illuminate said at least a portion of said travel surface with a light beam at a second time, different from said first time, when said at least a portion of said travel surface is covered by a layer of a contaminant;
using an imaging device, fixedly located in vicinity of said at least a portion of said travel surface, to:
image, at said first time, at least one first-time impingement of said at least one light beam on said at least a portion of said travel surface, and
image, at said second time, a second-time impingement of said light beam on said at least a portion of said travel surface covered by said layer of said contaminant; and using a computer, to calculate at least said height characteristic of said contaminant on said travel surface, in response to said imaging of (a) said at least one first-time impingement, and (b) said second-time impingement;
wherein said second-time impingement lies on a surface of said layer of said contaminant, and wherein calculating at least said height characteristic of said contaminant on said travel surface comprises calculating at least a distance between (a) said second-time impingement, and (b) a point on said travel surface that is closest to said second-time impingement;
wherein said at least one light beam includes at least two light beams, said imaging device being configured to image first-time impingements of said at least two light beams at said first time, and
wherein calculating at least said height characteristic of said contaminant on said travel surface comprises:
in response to said imaging at said first time, ascertaining an equation of a plane defined by said at least a portion of said travel surface, and in response to said equation of said plane, calculating said distance between (a) said second-time impingement, and (b) said point on said travel surface that is closest to said second-time impingement.

8. The method according to claim 7, wherein said contaminant includes snow, and wherein calculating at least said height characteristic of said contaminant comprises calculating at least a height characteristic of said snow.

9. The method according to claim 7, wherein said second-time impingement lies on said at least a portion of said travel surface, wherein said contaminant has a property selected from the group consisting of: transparency, and translucency, and wherein calculating at least said height characteristic of said contaminant comprises calculating at least a height characteristic of said contaminant having said selected property.

* * * * *